United States Patent
Honda et al.

(10) Patent No.: US 12,516,134 B2
(45) Date of Patent: Jan. 6, 2026

(54) IMMUNOGLOBULIN-BINDING PROTEIN AND AFFINITY SUPPORT USING SAME

(71) Applicants: JSR CORPORATION, Minato-ku (JP); JSR LIFE SCIENCES, LLC, Sunnyvale, CA (US); JSR MICRO N.V., Leuven (BE)

(72) Inventors: Toshinari Honda, Minato-ku (JP); Satoshi Nakamura, Minato-ku (JP); Shunsuke Onogi, Minato-ku (JP); Tomoaki Haga, Minato-ku (JP)

(73) Assignees: JSR CORPORATION, Minato-ku (JP); JSR LIFE SCIENCES, LLC, Sunnyvale, CA (US); JSR MICRO N.V., Leuven (BE)

( * ) Notice: Subject to any disclaimer, the term of this patent is extended or adjusted under 35 U.S.C. 154(b) by 1115 days.

(21) Appl. No.: 17/442,878

(22) PCT Filed: Feb. 28, 2020

(86) PCT No.: PCT/JP2020/008276
§ 371 (c)(1),
(2) Date: Sep. 24, 2021

(87) PCT Pub. No.: WO2020/202947
PCT Pub. Date: Oct. 8, 2020

(65) Prior Publication Data
US 2022/0242975 A1    Aug. 4, 2022

(30) Foreign Application Priority Data

Mar. 29, 2019    (JP) .................................. 2019-067428

(51) Int. Cl.
*C07K 7/08*       (2006.01)
*B01D 15/38*      (2006.01)
*B01J 20/281*     (2006.01)
*C07K 1/22*       (2006.01)
*C07K 14/31*      (2006.01)
*C07K 16/06*      (2006.01)
*C07K 17/08*      (2006.01)

(52) U.S. Cl.
CPC .......... *C07K 17/08* (2013.01); *B01D 15/3809* (2013.01); *B01J 20/281* (2013.01); *C07K 1/22* (2013.01); *C07K 14/31* (2013.01); *C07K 16/065* (2013.01); *B01J 2220/58* (2013.01); *B01J 2220/80* (2013.01)

(58) Field of Classification Search
CPC .......... C07K 17/08; C07K 1/22; C07K 14/31; C07K 16/065; B01D 15/3809; C12R 2001/445; G01N 33/531
See application file for complete search history.

(56) References Cited

U.S. PATENT DOCUMENTS

| 11,629,168 B2 * | 4/2023 | Yamanaka ........... B01J 20/3274 530/412 |
| 2010/0286373 A1 | 11/2010 | Majima et al. |
| 2016/0168209 A1 | 6/2016 | Yoshida et al. |
| 2016/0215027 A1 * | 7/2016 | Majima .................... C07K 1/22 |
| 2017/0333811 A1 | 11/2017 | Yoda et al. |

FOREIGN PATENT DOCUMENTS

| JP | 2007-252368 A | 10/2007 | |
| WO | WO-2012001142 A1 * | 1/2012 | ......... B01D 15/3804 |
| WO | WO 2014/046278 A1 | 3/2014 | |
| WO | WO 2015/034000 A1 | 3/2015 | |
| WO | WO 2016/125811 A1 | 8/2016 | |
| WO | WO-2016152946 A1 * | 9/2016 | ............... C07K 1/22 |

OTHER PUBLICATIONS

International Search Report issued on May 19, 2020 in PCT/JP2020/008276 filed Feb. 28, 2020, 2 pages.

* cited by examiner

*Primary Examiner* — Shafiqul Haq
(74) *Attorney, Agent, or Firm* — Oblon, McClelland, Maier & Neustadt, L.L.P.

(57) ABSTRACT

An affinity support having improved binding capacity for target proteins. An immunoglobulin-binding protein including a mutant immunoglobulin-binding domain, an affinity support including a solid-phase support and the immunoglobulin-binding protein immobilized thereto. The mutant immunoglobulin-binding domain consists of an amino acid sequence having at least 85% identity with an amino acid sequence of any of SEQ ID NOs: 1 to 12.

12 Claims, No Drawings
Specification includes a Sequence Listing.

SEQUENCE LISTING

<160> NUMBER OF SEQ ID NOS: 28

<210> SEQ ID NO 1
<211> LENGTH: 58
<212> TYPE: PRT
<213> ORGANISM: Staphylococcus aureus
<220> FEATURE:
<223> OTHER INFORMATION: Protein A, B domain

<400> SEQUENCE: 1

```
Ala Asp Asn Lys Phe Asn Lys Glu Gln Gln Asn Ala Phe Tyr Glu Ile
1               5                   10                  15

Leu His Leu Pro Asn Leu Asn Glu Glu Gln Arg Asn Gly Phe Ile Gln
            20                  25                  30

Ser Leu Lys Asp Asp Pro Ser Gln Ser Ala Asn Leu Leu Ala Glu Ala
        35                  40                  45

Lys Lys Leu Asn Asp Ala Gln Ala Pro Lys
    50                  55
```

<210> SEQ ID NO 2
<211> LENGTH: 58
<212> TYPE: PRT
<213> ORGANISM: Staphylococcus aureus
<220> FEATURE:
<223> OTHER INFORMATION: Protein A, Z domain

<400> SEQUENCE: 2

```
Val Asp Asn Lys Phe Asn Lys Glu Gln Gln Asn Ala Phe Tyr Glu Ile
1               5                   10                  15

Leu His Leu Pro Asn Leu Asn Glu Glu Gln Arg Asn Ala Phe Ile Gln
            20                  25                  30

Ser Leu Lys Asp Asp Pro Ser Gln Ser Ala Asn Leu Leu Ala Glu Ala
        35                  40                  45

Lys Lys Leu Asn Asp Ala Gln Ala Pro Lys
    50                  55
```

<210> SEQ ID NO 3
<211> LENGTH: 58
<212> TYPE: PRT
<213> ORGANISM: Staphylococcus aureus
<220> FEATURE:
<223> OTHER INFORMATION: Protein A, C domain

<400> SEQUENCE: 3

```
Ala Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Gly Phe Ile Gln
            20                  25                  30

Ser Leu Lys Asp Asp Pro Ser Val Ser Lys Glu Ile Leu Ala Glu Ala
        35                  40                  45
```

```
Lys Lys Leu Asn Asp Ala Gln Ala Pro Lys
    50                  55
```

<210> SEQ ID NO 4
<211> LENGTH: 61
<212> TYPE: PRT
<213> ORGANISM: Staphylococcus aureus
<220> FEATURE:
<223> OTHER INFORMATION: Protein A, D domain

<400> SEQUENCE: 4

```
Ala Asp Ala Gln Gln Asn Asn Phe Asn Lys Asp Gln Gln Ser Ala Phe
1               5                   10                  15

Tyr Glu Ile Leu Asn Met Pro Asn Leu Asn Glu Ala Gln Arg Asn Gly
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
    50                  55                  60
```

<210> SEQ ID NO 5
<211> LENGTH: 58
<212> TYPE: PRT
<213> ORGANISM: Staphylococcus aureus
<220> FEATURE:
<223> OTHER INFORMATION: Protein A, A domain

<400> SEQUENCE: 5

```
Ala Asp Asn Asn Phe Asn Lys Glu Gln Gln Asn Ala Phe Tyr Glu Ile
1               5                   10                  15

Leu Asn Met Pro Asn Leu Asn Glu Glu Gln Arg Asn Gly Phe Ile Gln
            20                  25                  30

Ser Leu Lys Asp Asp Pro Ser Gln Ser Ala Asn Leu Leu Ser Glu Ala
        35                  40                  45

Lys Lys Leu Asn Glu Ser Gln Ala Pro Lys
    50                  55
```

<210> SEQ ID NO 6
<211> LENGTH: 56
<212> TYPE: PRT
<213> ORGANISM: Staphylococcus aureus
<220> FEATURE:
<223> OTHER INFORMATION: Protein A, E domain

<400> SEQUENCE: 6

```
Ala Gln His Asp Glu Ala Gln Gln Asn Ala Phe Tyr Gln Val Leu Asn
1               5                   10                  15

Met Pro Asn Leu Asn Ala Asp Gln Arg Asn Gly Phe Ile Gln Ser Leu
            20                  25                  30

Lys Asp Asp Pro Ser Gln Ser Ala Asn Val Leu Gly Glu Ala Gln Lys
        35                  40                  45

Leu Asn Asp Ser Gln Ala Pro Lys
    50                  55
```

<210> SEQ ID NO 7
<211> LENGTH: 54
<212> TYPE: PRT
<213> ORGANISM: Staphylococcus aureus
<220> FEATURE:
<223> OTHER INFORMATION: Protein A, B domain variant

<400> SEQUENCE: 7

```
Phe Asn Lys Glu Gln Gln Asn Ala Phe Tyr Glu Ile Leu His Leu Pro
1               5                   10                  15

Asn Leu Asn Glu Glu Gln Arg Asn Gly Phe Ile Gln Ser Leu Lys Asp
            20                  25                  30

Asp Pro Ser Gln Ser Ala Asn Leu Leu Ala Glu Ala Lys Lys Leu Asn
        35                  40                  45

Asp Ala Gln Ala Pro Lys
        50

<210> SEQ ID NO 8
<211> LENGTH: 54
<212> TYPE: PRT
<213> ORGANISM: Staphylococcus aureus
<220> FEATURE:
<223> OTHER INFORMATION: Protein A, Z domain variant

<400> SEQUENCE: 8

Phe Asn Lys Glu Gln Gln Asn Ala Phe Tyr Glu Ile Leu His Leu Pro
1               5                   10                  15

Asn Leu Asn Glu Glu Gln Arg Asn Ala Phe Ile Gln Ser Leu Lys Asp
            20                  25                  30

Asp Pro Ser Gln Ser Ala Asn Leu Leu Ala Glu Ala Lys Lys Leu Asn
        35                  40                  45

Asp Ala Gln Ala Pro Lys
        50

<210> SEQ ID NO 9
<211> LENGTH: 54
<212> TYPE: PRT
<213> ORGANISM: Staphylococcus aureus
<220> FEATURE:
<223> OTHER INFORMATION: Protein A, C domain variant

<400> SEQUENCE: 9

Phe Asn Lys Glu Gln Gln Asn Ala Phe Tyr Glu Ile Leu His Leu Pro
1               5                   10                  15

Asn Leu Thr Glu Glu Gln Arg Asn Gly Phe Ile Gln Ser Leu Lys Asp
            20                  25                  30

Asp Pro Ser Val Ser Lys Glu Ile Leu Ala Glu Ala Lys Lys Leu Asn
        35                  40                  45

Asp Ala Gln Ala Pro Lys
        50

<210> SEQ ID NO 10
<211> LENGTH: 54
<212> TYPE: PRT
<213> ORGANISM: Staphylococcus aureus
<220> FEATURE:
<223> OTHER INFORMATION: Protein A, D domain variant

<400> SEQUENCE: 10

Phe Asn Lys Asp Gln Gln Ser Ala Phe Tyr Glu Ile Leu Asn Met Pro
1               5                   10                  15

Asn Leu Asn Glu Ala Gln Arg Asn Gly Phe Ile Gln Ser Leu Lys Asp
            20                  25                  30

Asp Pro Ser Gln Ser Thr Asn Val Leu Gly Glu Ala Lys Lys Leu Asn
        35                  40                  45

Glu Ser Gln Ala Pro Lys
        50
```

<210> SEQ ID NO 11
<211> LENGTH: 54
<212> TYPE: PRT
<213> ORGANISM: Staphylococcus aureus
<220> FEATURE:
<223> OTHER INFORMATION: Protein A, A domain variant

<400> SEQUENCE: 11

Phe Asn Lys Glu Gln Gln Asn Ala Phe Tyr Glu Ile Leu Asn Met Pro
1               5                   10                  15

Asn Leu Asn Glu Glu Gln Arg Asn Gly Phe Ile Gln Ser Leu Lys Asp
            20                  25                  30

Asp Pro Ser Gln Ser Ala Asn Leu Leu Ser Glu Ala Lys Lys Leu Asn
        35                  40                  45

Glu Ser Gln Ala Pro Lys
    50

<210> SEQ ID NO 12
<211> LENGTH: 54
<212> TYPE: PRT
<213> ORGANISM: Staphylococcus aureus
<220> FEATURE:
<223> OTHER INFORMATION: Protein A, E domain variant

<400> SEQUENCE: 12

His Asp Glu Ala Gln Gln Asn Ala Phe Tyr Gln Val Leu Asn Met Pro
1               5                   10                  15

Asn Leu Asn Ala Asp Gln Arg Asn Gly Phe Ile Gln Ser Leu Lys Asp
            20                  25                  30

Asp Pro Ser Gln Ser Ala Asn Val Leu Gly Glu Ala Gln Lys Leu Asn
        35                  40                  45

Asp Ser Gln Ala Pro Lys
    50

<210> SEQ ID NO 13
<211> LENGTH: 290
<212> TYPE: PRT
<213> ORGANISM: Staphylococcus aureus
<220> FEATURE:
<223> OTHER INFORMATION: PrA-1

<400> SEQUENCE: 13

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Lys Val Asp Asn Lys Phe Asn
    50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Lys Glu Ile Leu Ala Glu Ala Lys Lys Leu Asn Asp Ala
            100                 105                 110

Gln Ala Pro Lys Val Asp Asn Lys Phe Asn Lys Glu Gln Gln Asn Ala
        115                 120                 125

Phe Tyr Glu Ile Leu His Leu Pro Asn Leu Thr Glu Glu Gln Arg Asn
    130                 135                 140

Ala Phe Ile Gln Ser Leu Lys Asp Asp Pro Ser Val Ser Lys Glu Ile
145                 150                 155                 160

Leu Ala Glu Ala Lys Lys Leu Asn Asp Ala Gln Ala Pro Lys Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Lys Asp Asp Pro Ser Val Ser Lys Glu Ile Leu Ala Glu Ala Lys Lys
210                 215                 220

Leu Asn Asp Ala Gln Ala Pro Lys Val Asp Asn Lys Phe Asn Lys Glu
225                 230                 235                 240

Gln Gln Asn Ala Phe Tyr Glu Ile Leu His Leu Pro Asn Leu Thr Glu
            245                 250                 255

Glu Gln Arg Asn Ala Phe Ile Gln Ser Leu Lys Asp Asp Pro Ser Val
        260                 265                 270

Ser Lys Glu Ile Leu Ala Glu Ala Lys Lys Leu Asn Asp Ala Gln Ala Pro
        275                 280                 285

Lys
290

<210> SEQ ID NO 14
<211> LENGTH: 290
<212> TYPE: PRT
<213> ORGANISM: Staphylococcus aureus
<220> FEATURE:
<223> OTHER INFORMATION: PrA-2

<400> SEQUENCE: 14

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Arg Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
            85                  90                  95

Ser Val Ser Lys Glu Ile Leu Ala Glu Ala Lys Lys Leu Asn Asp Ala
        100                 105                 110

Gln Ala Pro Arg Val Asp Asn Lys Phe Asn Lys Glu Gln Gln Asn Ala
    115                 120                 125

Phe Tyr Glu Ile Leu His Leu Pro Asn Leu Thr Glu Glu Gln Arg Asn
130                 135                 140

Ala Phe Ile Gln Ser Leu Lys Asp Asp Pro Ser Val Ser Lys Glu Ile
145                 150                 155                 160

Leu Ala Glu Ala Lys Lys Leu Asn Asp Ala Gln Ala Pro Arg Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Lys Asp Asp Pro Ser Val Ser Lys Glu Ile Leu Ala Glu Ala Lys Lys
            210                 215                 220

Leu Asn Asp Ala Gln Ala Pro Arg Val Asp Asn Lys Phe Asn Lys Glu
225                 230                 235                 240

Gln Gln Asn Ala Phe Tyr Glu Ile Leu His Leu Pro Asn Leu Thr Glu
            245                 250                 255

Glu Gln Arg Asn Ala Phe Ile Gln Ser Leu Lys Asp Asp Pro Ser Val
            260                 265                 270

Ser Lys Glu Ile Leu Ala Glu Ala Lys Lys Leu Asn Asp Ala Gln Ala Pro
            275                 280                 285

Arg
290

<210> SEQ ID NO 15
<211> LENGTH: 290
<212> TYPE: PRT
<213> ORGANISM: Staphylococcus aureus
<220> FEATURE:
<223> OTHER INFORMATION: PrA-3

<400> SEQUENCE: 15

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Lys Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Lys Glu Ile Leu Ala Glu Ala Lys Lys Leu Asn Asp Ala
            100                 105                 110

Gln Ala Pro Lys Val Asp Asn Lys Phe Asn Lys Glu Gln Gln Asn Ala
        115                 120                 125

Phe Tyr Glu Ile Leu His Leu Pro Asn Leu Thr Glu Glu Gln Arg Asn
130                 135                 140

Ala Phe Ile Gln Ser Leu Lys Asp Asp Pro Ser Val Ser Lys Glu Ile
145                 150                 155                 160

Leu Ala Glu Ala Lys Lys Leu Asn Asp Ala Gln Ala Pro Lys Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Lys Asp Asp Pro Ser Val Ser Lys Glu Ile Leu Ala Glu Ala Lys Lys
210                 215                 220

Leu Asn Asp Ala Gln Ala Pro Arg Val Asp Asn Lys Phe Asn Lys Glu
225                 230                 235                 240

Gln Gln Asn Ala Phe Tyr Glu Ile Leu His Leu Pro Asn Leu Thr Glu
                245                 250                 255

Glu Gln Arg Asn Ala Phe Ile Gln Ser Leu Lys Asp Asp Pro Ser Val
            260                 265                 270

```
Ser Lys Glu Ile Leu Ala Glu Ala Lys Lys Leu Asn Asp Ala Gln Ala Pro
        275                 280                 285
Arg
290
```

<210> SEQ ID NO 16
<211> LENGTH: 232
<212> TYPE: PRT
<213> ORGANISM: Staphylococcus aureus
<220> FEATURE:
<223> OTHER INFORMATION: PrA-4

<400> SEQUENCE: 16

```
Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Lys Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Lys Glu Ile Leu Ala Glu Ala Lys Lys Leu Asn Asp Ala
            100                 105                 110

Gln Ala Pro Lys Val Asp Asn Lys Phe Asn Lys Glu Gln Gln Asn Ala
        115                 120                 125

Phe Tyr Glu Ile Leu His Leu Pro Asn Leu Thr Glu Glu Gln Arg Asn
130                 135                 140

Ala Phe Ile Gln Ser Leu Lys Asp Asp Pro Ser Val Ser Lys Glu Ile
145                 150                 155                 160

Leu Ala Glu Ala Lys Lys Leu Asn Asp Ala Gln Ala Pro Lys Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Lys Asp Asp Pro Ser Val Ser Lys Glu Ile Leu Ala Glu Ala Lys Lys
210                 215                 220

Leu Asn Asp Ala Gln Ala Pro Lys
225                 230
```

<210> SEQ ID NO 17
<211> LENGTH: 232
<212> TYPE: PRT
<213> ORGANISM: Staphylococcus aureus
<220> FEATURE:
<223> OTHER INFORMATION: PrA-5

<400> SEQUENCE: 17

```
Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Arg Asp Asp Pro Ser Val Ser Lys Glu Ile Leu Ala Glu Ala
```

```
                35                  40                  45
Lys Lys Leu Asn Asp Ala Gln Ala Pro Lys Val Asp Asn Lys Phe Asn
 50                  55                  60

Lys Glu Gln Gln Asn Ala Phe Tyr Glu Ile Leu His Leu Pro Asn Leu
 65                  70                  75                  80

Thr Glu Glu Gln Arg Asn Ala Phe Ile Gln Ser Leu Arg Asp Asp Pro
                 85                  90                  95

Ser Val Ser Lys Glu Ile Leu Ala Glu Ala Lys Lys Leu Asn Asp Ala
                100                 105                 110

Gln Ala Pro Lys Val Asp Asn Lys Phe Asn Lys Glu Gln Gln Asn Ala
            115                 120                 125

Phe Tyr Glu Ile Leu His Leu Pro Asn Leu Thr Glu Glu Gln Arg Asn
        130                 135                 140

Ala Phe Ile Gln Ser Leu Arg Asp Asp Pro Ser Val Ser Lys Glu Ile
145                 150                 155                 160

Leu Ala Glu Ala Lys Lys Leu Asn Asp Ala Gln Ala Pro Lys Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Arg Asp Asp Pro Ser Val Ser Lys Glu Ile Leu Ala Glu Ala Lys Lys
210                 215                 220

Leu Asn Asp Ala Gln Ala Pro Lys
225                 230

<210> SEQ ID NO 18
<211> LENGTH: 232
<212> TYPE: PRT
<213> ORGANISM: Staphylococcus aureus
<220> FEATURE:
<223> OTHER INFORMATION: PrA-6

<400> SEQUENCE: 18

Val Asp Asn Arg Phe Asn Arg Glu Gln Gln Asn Ala Phe Tyr Glu Ile
 1               5                  10                  15

Leu His Leu Pro Asn Leu Thr Glu Glu Gln Arg Asn Ala Phe Ile Gln
                20                  25                  30

Ser Leu Arg Asp Asp Pro Ser Val Ser Arg Glu Ile Leu Ala Glu Ala
            35                  40                  45

Arg Arg Leu Asn Asp Ala Gln Ala Pro Arg Val Asp Asn Arg Phe Asn
 50                  55                  60

Arg Glu Gln Gln Asn Ala Phe Tyr Glu Ile Leu His Leu Pro Asn Leu
 65                  70                  75                  80

Thr Glu Glu Gln Arg Asn Ala Phe Ile Gln Ser Leu Arg Asp Asp Pro
                 85                  90                  95

Ser Val Ser Arg Glu Ile Leu Ala Glu Ala Arg Arg Leu Asn Asp Ala
                100                 105                 110

Gln Ala Pro Arg Val Asp Asn Arg Phe Asn Arg Glu Gln Gln Asn Ala
            115                 120                 125

Phe Tyr Glu Ile Leu His Leu Pro Asn Leu Thr Glu Glu Gln Arg Asn
        130                 135                 140

Ala Phe Ile Gln Ser Leu Arg Asp Asp Pro Ser Val Ser Arg Glu Ile
145                 150                 155                 160

Leu Ala Glu Ala Arg Arg Leu Asn Asp Ala Gln Ala Pro Arg Val Asp
```

```
                165                 170                 175
Asn Arg Phe Asn Arg Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
            195                 200                 205

Arg Asp Asp Pro Ser Val Ser Arg Glu Ile Leu Ala Glu Ala Arg Arg
            210                 215                 220

Leu Asn Asp Ala Gln Ala Pro Arg
225                 230

<210> SEQ ID NO 19
<211> LENGTH: 228
<212> TYPE: PRT
<213> ORGANISM: Staphylococcus aureus
<220> FEATURE:
<223> OTHER INFORMATION: PrA-7

<400> SEQUENCE: 19

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
            35                  40                  45

Lys Lys Leu Asn Asp Ala Gln Ala Pro Val Asp Asn Lys Phe Asn Lys
        50                  55                  60

Glu Gln Gln Asn Ala Phe Tyr Glu Ile Leu His Leu Pro Asn Leu Thr
65                  70                  75                  80

Glu Glu Gln Arg Asn Ala Phe Ile Gln Ser Leu Lys Asp Asp Pro Ser
                85                  90                  95

Val Ser Lys Glu Ile Leu Ala Glu Ala Lys Lys Leu Asn Asp Ala Gln
            100                 105                 110

Ala Pro Val Asp Asn Lys Phe Asn Lys Glu Gln Gln Asn Ala Phe Tyr
            115                 120                 125

Glu Ile Leu His Leu Pro Asn Leu Thr Glu Glu Gln Arg Asn Ala Phe
130                 135                 140

Ile Gln Ser Leu Lys Asp Asp Pro Ser Val Ser Lys Glu Ile Leu Ala
145                 150                 155                 160

Glu Ala Lys Lys Leu Asn Asp Ala Gln Ala Pro Val Asp Asn Lys Phe
                165                 170                 175

Asn Lys Glu Gln Gln Asn Ala Phe Tyr Glu Ile Leu His Leu Pro Asn
            180                 185                 190

Leu Thr Glu Glu Gln Arg Asn Ala Phe Ile Gln Ser Leu Lys Asp Asp
            195                 200                 205

Pro Ser Val Ser Lys Glu Ile Leu Ala Glu Ala Lys Lys Leu Asn Asp
            210                 215                 220

Ala Gln Ala Pro
225

<210> SEQ ID NO 20
<211> LENGTH: 232
<212> TYPE: PRT
<213> ORGANISM: Staphylococcus aureus
<220> FEATURE:
<223> OTHER INFORMATION: PrA-8

<400> SEQUENCE: 20
```

```
Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
                20                  25                  30

Ser Leu Lys Asp Asp Pro Ser Val Ser Arg Glu Ile Leu Ala Glu Ala
            35                  40                  45

Lys Lys Leu Asn Asp Ala Gln Ala Pro Lys Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Arg Glu Ile Leu Ala Glu Ala Lys Lys Leu Asn Asp Ala
            100                 105                 110

Gln Ala Pro Lys Val Asp Asn Lys Phe Asn Lys Glu Gln Gln Asn Ala
            115                 120                 125

Phe Tyr Glu Ile Leu His Leu Pro Asn Leu Thr Glu Glu Gln Arg Asn
130                 135                 140

Ala Phe Ile Gln Ser Leu Lys Asp Asp Pro Ser Val Ser Arg Glu Ile
145                 150                 155                 160

Leu Ala Glu Ala Lys Lys Leu Asn Asp Ala Gln Ala Pro Lys Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
            195                 200                 205

Lys Asp Asp Pro Ser Val Ser Arg Glu Ile Leu Ala Glu Ala Lys Lys
210                 215                 220

Leu Asn Asp Ala Gln Ala Pro Lys
225                 230

<210> SEQ ID NO 21
<211> LENGTH: 232
<212> TYPE: PRT
<213> ORGANISM: Staphylococcus aureus
<220> FEATURE:
<223> OTHER INFORMATION: PrA-9

<400> SEQUENCE: 21

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
                20                  25                  30

Ser Leu Lys Asp Asp Pro Ser Val Ser Lys Glu Ile Leu Ala Glu Ala
            35                  40                  45

Arg Lys Leu Asn Asp Ala Gln Ala Pro Lys Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Lys Glu Ile Leu Ala Glu Ala Arg Lys Leu Asn Asp Ala
            100                 105                 110

Gln Ala Pro Lys Val Asp Asn Lys Phe Asn Lys Glu Gln Gln Asn Ala
            115                 120                 125
```

```
Phe Tyr Glu Ile Leu His Leu Pro Asn Leu Thr Glu Glu Gln Arg Asn
    130                 135                 140

Ala Phe Ile Gln Ser Leu Lys Asp Asp Pro Ser Val Ser Lys Glu Ile
145                 150                 155                 160

Leu Ala Glu Ala Arg Lys Leu Asn Asp Ala Gln Ala Pro Lys Val Asp
                165                 170                 175

Asn Lys Phe Asn Lys Glu Gln Gln Asn Ala Phe Tyr Glu Ile Leu His
                180                 185                 190

Leu Pro Asn Leu Thr Glu Glu Gln Arg Asn Ala Phe Ile Gln Ser Leu
                195                 200                 205

Lys Asp Asp Pro Ser Val Ser Lys Glu Ile Leu Ala Glu Ala Arg Lys
210                 215                 220

Leu Asn Asp Ala Gln Ala Pro Lys
225                 230

<210> SEQ ID NO 22
<211> LENGTH: 232
<212> TYPE: PRT
<213> ORGANISM: Staphylococcus aureus
<220> FEATURE:
<223> OTHER INFORMATION: PrA-10

<400> SEQUENCE: 22

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
                20                  25                  30

Ser Leu Lys Asp Asp Pro Ser Val Ser Lys Glu Ile Leu Ala Glu Ala
            35                  40                  45

Lys Arg Leu Asn Asp Ala Gln Ala Pro Lys Val Asp Asn Lys Phe Asn
        50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Lys Glu Ile Leu Ala Glu Ala Lys Arg Leu Asn Asp Ala
            100                 105                 110

Gln Ala Pro Lys Val Asp Asn Lys Phe Asn Lys Glu Gln Gln Asn Ala
        115                 120                 125

Phe Tyr Glu Ile Leu His Leu Pro Asn Leu Thr Glu Glu Gln Arg Asn
    130                 135                 140

Ala Phe Ile Gln Ser Leu Lys Asp Asp Pro Ser Val Ser Lys Glu Ile
145                 150                 155                 160

Leu Ala Glu Ala Lys Arg Leu Asn Asp Ala Gln Ala Pro Lys Val Asp
                165                 170                 175

Asn Lys Phe Asn Lys Glu Gln Gln Asn Ala Phe Tyr Glu Ile Leu His
                180                 185                 190

Leu Pro Asn Leu Thr Glu Glu Gln Arg Asn Ala Phe Ile Gln Ser Leu
                195                 200                 205

Lys Asp Asp Pro Ser Val Ser Lys Glu Ile Leu Ala Glu Ala Lys Arg
210                 215                 220

Leu Asn Asp Ala Gln Ala Pro Lys
225                 230

<210> SEQ ID NO 23
<211> LENGTH: 232
```

```
<212> TYPE: PRT
<213> ORGANISM: Staphylococcus aureus
<220> FEATURE:
<223> OTHER INFORMATION: PrA-11

<400> SEQUENCE: 23

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Arg Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Lys Glu Ile Leu Ala Glu Ala Lys Lys Leu Asn Asp Ala
            100                 105                 110

Gln Ala Pro Arg Val Asp Asn Lys Phe Asn Lys Glu Gln Gln Asn Ala
        115                 120                 125

Phe Tyr Glu Ile Leu His Leu Pro Asn Leu Thr Glu Glu Gln Arg Asn
130                 135                 140

Ala Phe Ile Gln Ser Leu Lys Asp Asp Pro Ser Val Ser Lys Glu Ile
145                 150                 155                 160

Leu Ala Glu Ala Lys Lys Leu Asn Asp Ala Gln Ala Pro Arg Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Lys Asp Asp Pro Ser Val Ser Lys Glu Ile Leu Ala Glu Ala Lys Lys
210                 215                 220

Leu Asn Asp Ala Gln Ala Pro Arg
225                 230

<210> SEQ ID NO 24
<211> LENGTH: 232
<212> TYPE: PRT
<213> ORGANISM: Staphylococcus aureus
<220> FEATURE:
<223> OTHER INFORMATION: PrA-12

<400> SEQUENCE: 24

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Arg Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95
```

Ser Val Ser Lys Glu Ile Leu Ala Glu Ala Lys Lys Leu Asn Asp Ala
                100                 105                 110

Gln Ala Pro Lys Val Asp Asn Lys Phe Asn Lys Glu Gln Gln Asn Ala
            115                 120                 125

Phe Tyr Glu Ile Leu His Leu Pro Asn Leu Thr Glu Glu Gln Arg Asn
130                 135                 140

Ala Phe Ile Gln Ser Leu Lys Asp Asp Pro Ser Val Ser Lys Glu Ile
145                 150                 155                 160

Leu Ala Glu Ala Lys Lys Leu Asn Asp Ala Gln Ala Pro Lys Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Lys Asp Asp Pro Ser Val Ser Lys Glu Ile Leu Ala Glu Ala Lys Lys
210                 215                 220

Leu Asn Asp Ala Gln Ala Pro Lys
225                 230

<210> SEQ ID NO 25
<211> LENGTH: 232
<212> TYPE: PRT
<213> ORGANISM: Staphylococcus aureus
<220> FEATURE:
<223> OTHER INFORMATION: PrA-13

<400> SEQUENCE: 25

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Lys Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Lys Glu Ile Leu Ala Glu Ala Lys Lys Leu Asn Asp Ala
            100                 105                 110

Gln Ala Pro Lys Val Asp Asn Lys Phe Asn Lys Glu Gln Gln Asn Ala
        115                 120                 125

Phe Tyr Glu Ile Leu His Leu Pro Asn Leu Thr Glu Glu Gln Arg Asn
130                 135                 140

Ala Phe Ile Gln Ser Leu Lys Asp Asp Pro Ser Val Ser Lys Glu Ile
145                 150                 155                 160

Leu Ala Glu Ala Lys Lys Leu Asn Asp Ala Gln Ala Pro Lys Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Lys Asp Asp Pro Ser Val Ser Lys Glu Ile Leu Ala Glu Ala Lys Lys
210                 215                 220

```
Leu Asn Asp Ala Gln Ala Pro Arg
225                 230
```

<210> SEQ ID NO 26
<211> LENGTH: 232
<212> TYPE: PRT
<213> ORGANISM: Staphylococcus aureus
<220> FEATURE:
<223> OTHER INFORMATION: PrA-14

<400> SEQUENCE: 26

```
Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Lys Val Asp Asn Lys Phe Asn
50                  55                  60

Lys Glu Gln Gln Asn Ala Phe Tyr Glu Ile Leu His Leu Pro Asn Leu
65                  70                  75                  80

Thr Glu Glu Gln Arg Asn Ala Phe Ile Gln Ser Leu Lys Asp Asp Pro
                85                  90                  95

Ser Val Ser Lys Glu Ile Leu Ala Glu Ala Lys Lys Leu Asn Asp Ala
            100                 105                 110

Gln Ala Pro Lys Val Asp Asn Lys Phe Asn Lys Glu Gln Gln Asn Ala
        115                 120                 125

Phe Tyr Glu Ile Leu His Leu Pro Asn Leu Thr Glu Glu Gln Arg Asn
130                 135                 140

Ala Phe Ile Gln Ser Leu Lys Asp Asp Pro Ser Val Ser Lys Glu Ile
145                 150                 155                 160

Leu Ala Glu Ala Lys Lys Leu Asn Asp Ala Gln Ala Pro Arg Val Asp
                165                 170                 175

Asn Lys Phe Asn Lys Glu Gln Gln Asn Ala Phe Tyr Glu Ile Leu His
            180                 185                 190

Leu Pro Asn Leu Thr Glu Glu Gln Arg Asn Ala Phe Ile Gln Ser Leu
        195                 200                 205

Lys Asp Asp Pro Ser Val Ser Lys Glu Ile Leu Ala Glu Ala Lys Lys
210                 215                 220

Leu Asn Asp Ala Gln Ala Pro Arg
225                 230
```

<210> SEQ ID NO 27
<211> LENGTH: 58
<212> TYPE: PRT
<213> ORGANISM: Staphylococcus aureus
<220> FEATURE:
<223> OTHER INFORMATION: PrA-15

<400> SEQUENCE: 27

```
Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Lys
50                  55
```

```
<210> SEQ ID NO 28
<211> LENGTH: 58
<212> TYPE: PRT
<213> ORGANISM: Staphylococcus aureus
<220> FEATURE:
<223> OTHER INFORMATION: PrA-16

<400> SEQUENCE: 28

Val Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Arg
    50                  55
```

IMMUNOGLOBULIN-BINDING PROTEIN AND AFFINITY SUPPORT USING SAME

FIELD OF THE INVENTION

The present invention relates to an immunoglobulin-binding protein, an affinity support using the protein, and a method of isolating an antibody or a fragment thereof using the affinity support.

BACKGROUND OF THE INVENTION

Antibodies have recently been widely used in, for example, research reagents or antibody medicines. These reagents and pharmaceutical antibodies are generally produced through purification by affinity chromatography. The antibodies can be affinity-purified using a ligand-immobilized column, which ligand is a substance specifically binding to an immunoglobulin. The ligand used is typically an immunoglobulin-binding protein such as protein A.

Protein A is a cell wall protein from a gram-positive bacterium *Staphylococcus aureus*. Protein A has five immunoglobulin-binding domains called E domain, D domain, A domain, B domain, and C domain, and each domain, by itself, can bind to an immunoglobulin. In addition to the naturally occurring immunoglobulin-binding domains of protein A, modified immunoglobulin-binding domains obtained by protein-engineering of the domains are also each utilized as a ligand for affinity purification.

Such an immunoglobulin-binding domain may be immobilized, as a ligand, onto a support of affinity column. This case frequently uses a method of chemically bonding a functional group on the domain to a functional group present on the support surface. However, the immunoglobulin-binding domain usually has a plurality of functional groups capable of reacting with the functional group on the support, and may be bonded to the support in a disordered orientation via the plurality of functional groups. The disordered bonding of the domain to such a support causes steric hindrance of the ligand on the support, thereby reducing the immunoglobulin-binding ligand capacity. A decrease in the immunoglobulin-binding ligand capacity causes a decrease in the yield of the immunoglobulin per support, which increases the cost of immunoglobulin purification.

A mutant immunoglobulin-binding domain capable of improving the immunoglobulin-binding capacity of an affinity support is disclosed. Patent Literature 1 discloses that the immunoglobulin-binding capacity of an affinity support is improved by a ligand containing a mutant domain obtained by substituting Lys at position 4, 7, or 35 with another amino acid residue or increasing the number of Lys residues after position 39 in the C or Z domain of protein A. Patent Literature 2 discloses that the immunoglobulin-binding capacity of an affinity support is improved by immobilizing a ligand onto the support via a mutant domain obtained by substituting, with another amino acid residue, Lys at at least position 35 among positions 4, 7, and 35 of the C domain of protein A. Patent Literature 3 discloses that the immunoglobulin-binding capacity of an affinity support is improved by a ligand containing two or more mutant domains obtained by substituting all Lys residues in the E, D, A, B, or C domain of protein A by other amino acid residues. Patent Literature 4 discloses that a protein having two or more domains from the E, D, or A domain of protein A, in which domains C-terminal lysine has been deleted or substituted, has high protease resistance and can retain their immunoglobulin-binding activity.

CITATION LIST

Patent Literature

Patent Literature 1: JP 2007-252368 A
Patent Literature 2: WO 2015/034000
Patent Literature 3: WO 2014/046278
Patent Literature 4: WO 2016/125811

SUMMARY OF THE INVENTION

Problems to be Solved by the Invention

There is a need for an affinity support having improved immunoglobulin-binding capacity. The present invention provides an immunoglobulin-binding protein containing a mutant immunoglobulin-binding domain, which can improve the immunoglobulin-binding capacity of an affinity support, and an affinity support using the immunoglobulin-binding protein. The invention also provides a method of isolating an antibody or a fragment thereof using the affinity support.

Means for Solving the Problem

The invention provides the following.

[1] An affinity support comprising:
  a solid-phase support and an immunoglobulin-binding protein immobilized onto the solid-phase support,
  the immunoglobulin-binding protein comprising at least one mutant immunoglobulin-binding domain,
  the mutant immunoglobulin-binding domain consisting of an amino acid sequence having at least 85° identity with an amino acid sequence of any of SEQ ID NOs: 1 to 12,
  wherein the amino acid sequence of the mutant immunoglobulin-binding domain has at least one mutation selected from the group consisting of the following (a) to (d):
  (a) a substitution of Lys with another amino acid residue, a deletion of Lys, or an insertion of another amino acid residue at a position before or after Lys at a position corresponding to position 58 of the amino acid sequence of SEQ ID NO: 3;
  (b) a substitution of Lys with another amino acid residue, a deletion of Lys, or an insertion of another amino acid residue at a position before or after Lys at a position corresponding to position 50 of the amino acid sequence of SEQ ID NO: 3;
  (c) a substitution of Lys with another amino acid residue, a deletion of Lys, or an insertion of another amino acid residue at a position before or after Lys at a position corresponding to position 49 of the amino acid sequence of SEQ ID NO: 3; and
  (d) a substitution of Lys with another amino acid residue, a deletion of Lys, or an insertion of another amino acid residue at a position before or after Lys at a position corresponding to position 42 of the amino acid sequence of SEQ ID NO: 3, and
  has Lys at at least one position selected from the group consisting of positions corresponding to positions 4, 7, and 35 in the amino acid sequence of SEQ ID NO: 3.

[2] The affinity support according to [1], wherein the mutant immunoglobulin-binding domain consists of an amino acid sequence having at least 85% identity with the amino acid sequence of SEQ ID NO: 3 or 9.

[3] The affinity support according to [1] or [2], wherein the mutation (a) is a substitution of Lys by Arg, a deletion of Lys, or an insertion of Arg at a position before Lys at a position corresponding to position 58 of the amino acid sequence of SEQ ID NO: 3;
the mutation (b) is a substitution of Lys by Arg, a deletion of Lys, or an insertion of Arg at a position before Lys at a position corresponding to position 50 of the amino acid sequence of SEQ ID NO: 3;
the mutation (c) is a substitution of Lys by Arg, a deletion of Lys, or an insertion of Arg at a position before Lys at a position corresponding to position 49 of the amino acid sequence of SEQ ID NO: 3; and
the mutation (d) is a substitution of Lys by Arg, a deletion of Lys, or an insertion of Arg at a position before Lys at a position corresponding to position 42 in the amino acid sequence of SEQ ID NO: 3.

[4] The affinity support according to any one of [1] to [3], wherein the mutant immunoglobulin-binding domain consists of an amino acid sequence having the mutation (a).

[5] The affinity support according to [4], wherein the mutant immunoglobulin-binding domain has Arg at a position corresponding to position 58 of the amino acid sequence of SEQ ID NO: 3.

[6] The affinity support according to any one of [1] to [5], wherein the mutant immunoglobulin-binding domain consists of an amino acid sequence having at least 90% identity with the amino acid sequence of any of SEQ ID NOs: 1 to 12.

[7] The affinity support according to any one of [1] to [6], wherein the mutant immunoglobulin-binding domain has at least one amino acid residue selected from the group consisting of Val at a position corresponding to position 1 of the amino acid sequence of SEQ ID NO: 3 and Ala at a position corresponding to position 29 of the amino acid sequence of SEQ ID NO: 3.

[8] The affinity support according to any one of [1] to [7], wherein the immunoglobulin-binding protein comprises two or more immunoglobulin-binding domains.

[9] The affinity support according to any one of [1] to [8], wherein the solid-phase support and the immunoglobulin-binding protein are immobilized via a linker, and the linker has a structural unit represented by the following formula (1):

$$\left[\text{CH}_2\text{CH}_2\text{O}\right]_n \quad (1)$$

wherein n is an integer of 4 or more and 100 or less.

[10] A chromatography column comprising the affinity support according to any one of [1] to [9].

[11] A method of isolating an antibody or a fragment thereof, comprising using the affinity support according to any one of [1] to [9] or the chromatography column according to [10].

[12] An immunoglobulin-binding protein, comprising:
at least one mutant immunoglobulin-binding domain, the mutant immunoglobulin-binding domain consisting of an amino acid sequence having at least 85% identity with an amino acid sequence of any of SEQ ID NOs: 1 to 12,
wherein the amino acid sequence of the mutant immunoglobulin-binding domain has at least one mutation selected from the group consisting of the following (a) to (d):
(a) a substitution of Lys with another amino acid residue, a deletion of Lys, or an insertion of another amino acid residue at a position before or after Lys at a position corresponding to position 58 of the amino acid sequence of SEQ ID NO: 3;
(b) a substitution of Lys with another amino acid residue, a deletion of Lys, or an insertion of another amino acid residue at a position before or after Lys at a position corresponding to position 50 of the amino acid sequence of SEQ ID NO: 3;
(c) a substitution of Lys with another amino acid residue, a deletion of Lys, or an insertion of another amino acid residue at a position before or after Lys at a position corresponding to position 49 of the amino acid sequence of SEQ ID NO: 3; and
(d) a substitution of Lys with another amino acid residue, a deletion of Lys, or an insertion of another amino acid residue at a position before or after Lys at a position corresponding to position 42 of the amino acid sequence of SEQ ID NO: 3, and
has Lys at at least one position selected from the group consisting of positions corresponding to positions 4, 7, and 35 in the amino acid sequence of SEQ ID NO: 3.

[13] The immunoglobulin-binding protein according to [12], wherein the mutant immunoglobulin-binding domain consists of an amino acid sequence having at least 85% identity with the amino acid sequence of SEQ ID NO: 3 or 9.

[14] The immunoglobulin-binding protein according to [12] or [13], wherein the mutation (a) is a substitution of Lys by Arg, a deletion of Lys, or an insertion of Arg at a position before Lys at a position corresponding to position 58 of the amino acid sequence of SEQ ID NO: 3;
the mutation (b) is a substitution of Lys by Arg, a deletion of Lys, or an insertion of Arg at a position before Lys at a position corresponding to position 50 of the amino acid sequence of SEQ ID NO: 3;
the mutation (c) is a substitution of Lys by Arg, a deletion of Lys, or an insertion of Arg at a position before Lys at a position corresponding to position 49 of the amino acid sequence of SEQ ID NO: 3; and
the mutation (d) is a substitution of Lys by Arg, a deletion of Lys, or an insertion of Arg at a position before Lys at a position corresponding to position 42 in the amino acid sequence of SEQ ID NO: 3.

[15] The immunoglobulin-binding protein according to any one of [12] to [14], wherein the mutant immunoglobulin-binding domain consists of an amino acid sequence having the mutation (a).

[16] The immunoglobulin-binding protein according to [15], wherein the mutant immunoglobulin-binding domain has Arg at a position corresponding to position 58 of the amino acid sequence of SEQ ID NO: 3.

[17] The immunoglobulin-binding protein according to any one of [12] to [16], wherein the mutant immunoglobulin-binding domain consists of an amino acid sequence having at least 90% identity with the amino acid sequence of any of SEQ ID NOs: 1 to 12.

[18] The immunoglobulin-binding protein according to any one of [12] to [17], wherein the mutant immunoglobulin-binding domain has at least one amino acid residue selected from the group consisting of Val at a position corresponding to position 1 of the amino acid sequence of SEQ ID NO: 3 and Ala at a position corresponding to position 29 of the amino acid sequence of SEQ ID NO: 3.

[19] The immunoglobulin-binding protein according to any one of [12] to [18], comprising two or more immunoglobulin-binding domains.

[20] A method for producing an affinity support, comprising immobilizing the immunoglobulin-binding protein according to any one of [12] to [19] onto a solid-phase support.

[21] A polynucleotide that encodes the immunoglobulin-binding protein according to any one of [12] to [19].

[22] A vector comprising the polynucleotide according to [21].

[23] A transformant comprising the vector according to [22].

[24] A process for producing an immunoglobulin-binding protein, comprising expressing or chemically synthesizing the immunoglobulin-binding protein according to any one of [12] to [19] in the transformant according to [23] or a cell-free protein synthesis system.

[25] A process for producing an immunoglobulin-binding protein, comprising:
  introducing, into a polypeptide chain consisting of an amino acid sequence having at least 85% identity with an amino acid sequence set forth in any of SEQ ID NOs: 1 to 12 and having immunoglobulin-binding activity, at least one mutation selected from the group consisting of the following (a') to (d'):
  (a') a deletion or a substitution of an amino acid residue at a position corresponding to position 58 of the amino acid sequence of SEQ ID NO: 3 with another amino acid residue, or an insertion of another amino acid residue at a position before or after the former position;
  (b') a deletion or a substitution of an amino acid residue at a position corresponding to position 50 of the amino acid sequence of SEQ ID NO: 3 with another amino acid residue, or an insertion of another amino acid residue at a position before or after the former position;
  (c') a deletion or a substitution of an amino acid residue at a position corresponding to position 49 of the amino acid sequence of SEQ ID NO: 3 with another amino acid residue, or an insertion of another amino acid residue at a position before or after the former position; and
  (d') a deletion or a substitution of an amino acid residue at a position corresponding to position 42 of the amino acid sequence of SEQ ID NO: 3 with another amino acid residue, or an insertion of another amino acid residue at a position before or after the former position
  wherein the polypeptide chain has Lys at at least one position selected from the group consisting of positions corresponding to positions 4, 7, and 35 in the amino acid sequence of SEQ ID NO: 3.

Effects of the Invention

The immunoglobulin-binding protein of the invention has high immunoglobulin-binding activity, and is useful as an affinity ligand. The invention makes it possible to provide an affinity support having improved immunoglobulin-binding capacity.

DETAILED DESCRIPTION OF THE INVENTION

All patent, non-patent, and other publications cited herein are incorporated herein by reference in their entirety.

As used herein, the identity between amino acid sequences or between nucleotide sequences may be determined using algorithm BLAST by Karlin and Altschul (Pro. Natl. Acad. Sci. USA, 1993, 90: 5873-5877). Based on this BLAST algorithm, programs called BLASTN, BLASTX, BLASTP, TBLASTN, and TBLASTX have been developed (J. Mol. Biol., 1990, 215: 403-410). When these programs are used, default parameters of each program may be used. Specific techniques using these analysis methods are known (see www.ncbi.nlm.nih.gov).

As used herein, the wording "at least 85% identity" with respect to amino acid sequences and nucleotide sequences refers to 85% or higher identity, preferably 90% or higher identity, and more preferably 94% or higher identity.

As used herein, the "corresponding position" of an amino acid sequence or a nucleotide sequence may be determined by aligning a target sequence and a reference sequence (e.g., the amino acid sequence of SEQ ID NO: 3) such that the maximum homology is given to the conserved amino acid residues or nucleotides present between respective amino acid sequences or nucleotide sequences. The alignment can be performed using known algorithms, the procedures of which are known to those skilled in the art. For example, the alignment may be performed using Clustal W multiple alignment program (Thompson, J. D. et al., 1994, Nucleic Acids Res., 22: 4673-4680) with default settings. Clustal W may be used, for example, on the web sites of the European Bioinformatics Institute (European Bioinformatics Institute: EBI [www.ebi.ac.uk/index.html]) and the Japanese DNA Data Bank (DDBJ [www.ddbj.nig.ac.jp/Welcome-j.html]) operated by the National Institute of Genetics.

As used herein, amino acid residues are also abbreviated as follows: alanine (Ala or A), arginine (Arg or R), asparagine (Asn or N), aspartic acid (Asp or D), cysteine (Cys or C), glutamine (Gln or Q), glutamic acid (Glu or E), glycine (Gly or G), histidine (His or H), isoleucine (Ile or I), leucine (Leu or L), lysine (Lys or K), methionine (Met or M), phenylalanine (Phe or F), proline (Pro or P), serine (Ser or S), threonine (Thr or T), tryptophan (Trp or W), tyrosine (Tyr or Y), valine (Val or V), or any amino acid residue (Xaa or X). In addition, as used herein, the amino acid sequence of a peptide is denoted such that the amino terminus (hereinafter, referred to as N-terminus) is located on the left side and the carboxyl terminus (hereinafter, referred to as C-terminus) is located on the right side according to a conventional way.

As used herein, the position "before" or "after" a specific position of an amino acid sequence refers to a position proximal to the N-terminal side or the C-terminal side of the specific position, respectively. For example, when an amino acid residue is inserted "before" or "after" a specific position, the amino acid residue after insertion is placed at a position proximal to the N-terminal side or the C-terminal side of the specific position.

As used herein, the "immunoglobulin-binding protein" refers to a protein having an affinity for an immunoglobulin (or an antibody or a fragment of an antibody). As used herein, the term "immunoglobulin" (Ig) includes any class of immunoglobulins such as IgG, IgA, IgD, IgE, IgM, and subclasses thereof. The "antibody" herein refers to an immunoglobulin or a fragment thereof containing an antigen recognition site, and may include, for example, any class of immunoglobulins such as IgG, IgA, IgD, IgE, IgM, and subclasses thereof, fragments thereof, or variants thereof. In addition, the "antibody" herein may be, for example, a chimeric antibody such as a humanized antibody, an antibody complex, or another modified immunoglobulin containing an antigen recognition site. Further, the "fragment of an antibody" herein may be an antibody fragment containing an antigen recognition site or an antibody fragment without any antigen recognition site. Examples of the antibody fragment without any antigen recognition site include a protein consisting of an Fc region of an immunoglobulin, an Fc fusion protein, or variants or modified products thereof.

As used herein, the "immunoglobulin-binding domain" refers to a polypeptide chain that is included in an immunoglobulin-binding protein and, by itself, has, as a component, a functional unit with immunoglobulin (or antibody or antibody fragment) binding activity. Preferable examples of the "immunoglobulin-binding domain" include an immunoglobulin-binding domain of protein A, an immunoglobulin-binding domain of protein L, or variants thereof having an immunoglobulin-binding activity.

As used herein, protein A refers to protein A that is a cell wall component of *Staphylococcus aureus* (hereinafter, also referred to as ProA). Examples of the immunoglobulin-binding domain of ProA include B domain, C domain, D domain, A domain, E domain, or Z domain, which is a modified B domain, of ProA.

As used herein, protein L refers to protein L (hereinafter, also referred to as ProL), which is a kind of protein produced by *Finegoldia magna*. Examples of the immunoglobulin-binding domain of ProL include B1 domain, B2 domain, B3 domain, B4 domain, or B5 domain of ProL produced by the *Finegoldia magna* 312 strain, or C1 domain, C2 domain, C3 domain, or C4 domain of ProL produced by the *F. magna* 3316 strain.

1. Immunoglobulin-Binding Protein

The immunoglobulin-binding protein of the invention contains at least one mutant immunoglobulin-binding domain created using an immunoglobulin-binding domain derived from ProA or ProL. In the following description, the mutant immunoglobulin-binding domain may be obtained by adding a given mutation to an immunoglobulin-binding domain derived from ProA or ProL as a parent domain or a variant thereof. Hereinafter, the mutant immunoglobulin-binding domain provided by the invention is also referred to as a mutant immunoglobulin-binding domain in the invention.

Examples of the parent domain for the mutant immunoglobulin-binding domain in the invention include immunoglobulin-binding domains of ProA, such as A domain, B domain, C domain, D domain, E domain, Z domain, and variants thereof; or immunoglobulin-binding domains of ProL, such as B1 domain, B2 domain, B3 domain, B4 domain, B5 domain, C1 domain, C2 domain, C3 domain, C4 domain, and variants thereof. Among them, A domain, B domain, C domain, D domain, E domain, or Z domain of ProA, or variants thereof are preferable; B domain, Z domain, or C domain of ProA, or variants thereof are more preferable; and C domain of ProA or variants thereof are still more preferable. Hereinafter, the procedure for preparing an immunoglobulin-binding domain in the invention will be described using, as an example, a case where the immunoglobulin-binding domain of ProA is used as a parent domain.

However, in the case of using a domain of ProL as the parent domain, the immunoglobulin-binding domain in the invention can be prepared by substantially the same procedure. Information about the sequence of any immunoglobulin-binding domain of ProL can be acquired from, for example, a public database.

The B domain of ProA is a polypeptide chain consisting of the amino acid sequence of SEQ ID NO: 1. Examples of a B domain variant include a polypeptide chain consisting of an amino acid sequence having at least 85% identity with the amino acid sequence of SEQ ID NO: 1 and having an immunoglobulin-binding activity. The Z domain of ProA is a polypeptide chain consisting of the amino acid sequence of SEQ ID NO: 2. Examples of a Z domain variant include a polypeptide chain consisting of an amino acid sequence having at least 85% identity with the amino acid sequence of SEQ ID NO: 2 and having an immunoglobulin-binding activity. The C domain of ProA is a polypeptide chain consisting of the amino acid sequence of SEQ ID NO: 3. Examples of a C domain variant include a polypeptide chain consisting of an amino acid sequence having at least 85% identity with the amino acid sequence of SEQ ID NO: 3 and having an immunoglobulin-binding activity. The D domain of ProA is a polypeptide chain consisting of the amino acid sequence of SEQ ID NO: 4. Examples of a D domain variant include a polypeptide chain consisting of an amino acid sequence having at least 85% identity with the amino acid sequence of SEQ ID NO: 4 and having an immunoglobulin-binding activity. The A domain of ProA is a polypeptide chain consisting of the amino acid sequence of SEQ ID NO: 5. Examples of an A domain variant include a polypeptide chain consisting of an amino acid sequence having at least 85% identity with the amino acid sequence of SEQ ID NO: 5 and having an immunoglobulin-binding activity. The E domain of ProA is a polypeptide chain consisting of the amino acid sequence of SEQ ID NO: 6. Examples of an E domain variant include a polypeptide chain consisting of an amino acid sequence having at least 85% identity with the amino acid sequence of SEQ ID NO: 6 and having an immunoglobulin-binding activity.

As an immunoglobulin-binding domain having a more stable protein structure, an immunoglobulin-binding domain variant lacking an N-terminal region of a naturally occurring immunoglobulin-binding domain has been reported (e.g., WO 2013/109302, WO 2017/194596). Thus, as long as having immunoglobulin-binding activity, the parent domain may be an immunoglobulin-binding domain variant in which amino acid residues corresponding to at least two N-terminal residues (e.g., 2 residues, 4 residues, 6 residues, or 7 residues) are deleted from the amino acid sequence of any of SEQ ID NOs: 1 to 6. Examples of such a parent domain include a polypeptide chain consisting of the amino acid sequence of any of SEQ ID NOs: 7 to 12, which polypeptide chain is a mutant immunoglobulin-binding domain in which 2 to 7 N-terminal residues have been deleted from the amino acid sequence of any of SEQ ID NOs: 1 to 6, respectively. Hence, the amino acid sequence having at least 85% identity with the amino acid sequence of any of SEQ ID NOs: 1 to 6 as the parent domain described above may be the amino acid sequence of any of SEQ ID NOs: 7 to 12, or an amino acid sequence having at least 85% identity therewith.

Thus, preferred examples of a parent domain in the invention include a polypeptide chain consisting of the amino acid sequence of any of SEQ ID NOs: 1 to 12 or a polypeptide chain consisting of an amino acid sequence having at least 85% identity with the amino acid sequence of any of SEQ ID NOs: 1 to 12 and having an immunoglobulin-binding activity. More preferred examples of the parent domain include a polypeptide chain consisting of the amino acid sequence of any of SEQ ID NO: 1, 2, 3, 7, 8, or 9 or a polypeptide chain consisting of an amino acid sequence having at least 85% identity with the amino acid sequence of any of SEQ ID NO: 1, 2, 3, 7, 8, or 9 and having an immunoglobulin-binding activity. Still more preferred examples of the parent domain include a polypeptide chain consisting of the amino acid sequence of SEQ ID NO: 3 or 9 or a polypeptide chain consisting of an amino acid sequence having at least 85% identity with the amino acid sequence of SEQ ID NO: 3 or 9 and having an immunoglobulin-binding activity. Still more preferred examples of the parent domain include a polypeptide chain consisting of the amino acid sequence of SEQ ID NO: 3 or a polypeptide chain consisting of an amino acid sequence having at least 85% identity with the amino acid sequence of SEQ ID NO: 3 and having an immunoglobulin-binding activity.

From the viewpoint of increasing the expression level of a protein in a transformant (PNAS, 1989, 86: 8247-8251, FIG. 2) or from the viewpoint of facilitating construction of a polynucleotide encoding an immunoglobulin-binding protein having a plurality of domains linked (WO 2010/110288), the parent domain may contain a substitution of Ala by Val at a position corresponding to position 1 of the amino acid sequence of SEQ ID NO: 3. In addition, from the viewpoint of improving chemical stability of the immunoglobulin-binding protein, thereby increasing alkali resistance, the parent domain may further contain a substitution of Gly by Ala at a position corresponding to position 29 of the amino acid sequence of SEQ ID NO: 3 (Journal of Chromatography B, 2007, 848 (1): 40-47). Thus, the amino acid sequence having at least 85% identity with the amino acid sequence of any of SEQ ID NOs: 1 to 12 used as the parent domain may have Val at a position corresponding to position 1 of the amino acid sequence of SEQ ID NO: 3 or may have Ala at a position corresponding to position 29 of the amino acid sequence of SEQ ID NO: 3, and preferably has Val at a position corresponding to position 1 of the amino acid sequence of SEQ ID NO: 3 and Ala at a position corresponding to position 29 of the amino acid sequence of SEQ ID NO: 3.

The above-described variants of immunoglobulin-binding domains of ProA can be each produced by modifying the amino acid sequence of an immunoglobulin-binding domain of ProA by, for example, insertion, substitution, or deletion of an amino acid residue(s), or chemical modification of an amino acid residue(s). Examples of the means for inserting, removing, substituting, or deleting an amino acid residue(s) include known means such as site-specific mutagenesis for a polynucleotide encoding the domain.

The mutant immunoglobulin-binding domain in the invention is a polypeptide chain obtained by introducing, into the above-mentioned parent domain, at least one mutation selected from the group consisting of the following (a) to (d):

(a) a substitution of Lys with another amino acid residue, a deletion of Lys, or an insertion of another amino acid residue at a position before or after Lys at a position corresponding to position 58 of the amino acid sequence of SEQ ID NO: 3;

(b) a substitution of Lys with another amino acid residue, a deletion of Lys, or an insertion of another amino acid residue at a position before or after Lys at a position corresponding to position 50 of the amino acid sequence of SEQ ID NO: 3;

(c) a substitution of Lys with another amino acid residue, a deletion of Lys, or an insertion of another amino acid residue at a position before or after Lys at a position corresponding to position 49 of the amino acid sequence of SEQ ID NO: 3; and (d) a substitution of Lys with another amino acid residue, a deletion of Lys, or an insertion of another amino acid residue at a position before or after Lys at a position corresponding to position 42 of the amino acid sequence of SEQ ID NO: 3.

Mutation (a) is a substitution of Lys with another amino acid residue, a deletion of Lys, or an insertion of another amino acid residue at a position before or after Lys at a position corresponding to position 58 of the amino acid sequence of SEQ ID NO: 3. Examples of the amino acid residue to be substituted include Gly, Ala, Val, Leu, Ile, Met, Pro, Phe, Trp, Asn, Gln, His, or Arg, preferably His or Arg, and more preferably Arg. Examples of the amino acid residue to be inserted include Gly, Ala, Val, Leu, Ile, Met, Pro, Phe, Trp, Asn, Gln, His, or Arg, preferably His or Arg, and more preferably Arg. Preferably, the mutation (a) is a substitution of Lys by Arg, a deletion of Lys, or an insertion of Arg into a position before Lys at a position corresponding to position 58 of the amino acid sequence of SEQ ID NO: 3. More preferably, the mutation (a) is a substitution of Lys by Arg at a position corresponding to position 58 of the amino acid sequence of SEQ ID NO: 3.

Mutation (b) is a substitution of Lys with another amino acid residue, a deletion of Lys, or an insertion of another amino acid residue at a position before or after Lys at a position corresponding to position 50 of the amino acid sequence of SEQ ID NO: 3. Examples of the amino acid residue to be substituted include Gly, Ala, Val, Leu, Ile, Met, Pro, Phe, Trp, Asn, Gln, His, or Arg, preferably His or Arg, and more preferably Arg. Examples of the amino acid residue to be inserted include Gly, Ala, Val, Leu, Ile, Met, Pro, Phe, Trp, Asn, Gln, His, or Arg, preferably His or Arg, and more preferably Arg. Preferably, the mutation (b) is a substitution of Lys by Arg, a deletion of Lys, or an insertion of Arg into a position before Lys at a position corresponding to position 50 of the amino acid sequence of SEQ ID NO: 3. More preferably, the mutation (b) is a substitution of Lys by Arg at a position corresponding to position 50 of the amino acid sequence of SEQ ID NO: 3.

Mutation (c) is a substitution of Lys with another amino acid residue, a deletion of Lys, or an insertion of another amino acid residue at a position before or after Lys at a position corresponding to position 49 of the amino acid sequence of SEQ ID NO: 3. Examples of the amino acid residue to be substituted include Gly, Ala, Val, Leu, Ile, Met, Pro, Phe, Trp, Asn, Gln, His, or Arg, preferably His or Arg, and more preferably Arg. Examples of the amino acid residue to be inserted include Gly, Ala, Val, Leu, Ile, Met, Pro, Phe, Trp, Asn, Gin, His, or Arg, preferably His or Arg, and more preferably Arg. Preferably, the mutation (c) is a substitution of Lys by Arg, a deletion of Lys, or an insertion of Arg into a position before Lys at a position corresponding to position 49 of the amino acid sequence of SEQ ID NO: 3. More preferably, the mutation (c) is a substitution of Lys by Arg at a position corresponding to position 49 of the amino acid sequence of SEQ ID NO: 3.

Mutation (d) is a substitution of Lys with another amino acid residue, a deletion of Lys, or an insertion of another amino acid residue at a position before or after Lys at a position corresponding to position 42 of the amino acid sequence of SEQ ID NO: 3. Examples of the amino acid residue to be substituted include Gly, Ala, Val, Leu, Ile, Met, Pro, Phe, Trp, Asn, Gln, His, or Arg, preferably His or Arg, and more preferably Arg. Examples of the amino acid residue to be inserted include Gly, Ala, Val, Leu, Ile, Met, Pro, Phe, Trp, Asn, Gln, His, or Arg, preferably His or Arg, and more preferably Arg. Preferably, the mutation (d) is a substitution of Lys by Arg, a deletion of Lys, or an insertion of Arg at a position before Lys at a position corresponding to position 42 of the amino acid sequence of SEQ ID NO: 3. More preferably, the mutation (d) is a substitution of Lys by Arg at a position corresponding to position 42 of the amino acid sequence of SEQ ID NO: 3.

In a preferred embodiment, the mutant immunoglobulin-binding domain is produced by introducing at least one mutation selected from the group consisting of (a) to (d) into a polypeptide chain consisting of the amino acid sequence of any of SEQ ID NOs: 1 to 12. In another preferred embodiment, the mutant immunoglobulin-binding domain is produced by introducing at least one mutation selected from the group consisting of (a) to (d) into a polypeptide chain consisting of an amino acid sequence having at least 85% identity with the amino acid sequence of any of SEQ ID NOs: 1 to 12 and having an immunoglobulin-binding activity.

In a more preferred embodiment, the mutant immunoglobulin-binding domain is produced by introducing at least one mutation selected from the group consisting of (a) to (d) into a polypeptide chain consisting of the amino acid sequence of any of SEQ ID NO: 1, 2, 3, 7, 8, or 9. In another more preferred embodiment, the mutant immunoglobulin-binding domain is produced by introducing at least one mutation selected from the group consisting of (a) to (d) into a polypeptide chain consisting of an amino acid sequence having at least 85% identity with the amino acid sequence of any of SEQ ID NO: 1, 2, 3, 7, 8, or 9 and having an immunoglobulin-binding activity.

In a further preferred embodiment, the mutant immunoglobulin-binding domain is produced by introducing at least one mutation selected from the group consisting of (a) to (d) into a polypeptide chain consisting of the amino acid sequence of SEQ ID NO: 3 or 9, or a polypeptide chain consisting of an amino acid sequence having at least 85% identity therewith and having an immunoglobulin-binding activity.

The introduced mutation may be any one of (a) to (d) or a combination of two or more thereof, and is preferably (a) or a combination of (a) and any one or more of (b) to (d). In a preferred embodiment, the introduced mutation is at least one selected from the group consisting of K58R, K50R, K49R, K42R, ΔK58, ΔK50, ΔK49, and ΔK42, or a combination of two or more thereof. In a more preferred embodiment, the introduced mutation is K58R, ΔK58, or a combination of K58R and any one or more of K50R, K49R, or K42R.

As used herein, K58R, K50R, K49R, or K42R means a substitution of Lys by Arg at a position corresponding to position 58, 50, 49, or 42, respectively, of the amino acid sequence of SEQ ID NO: 3. In addition, as used herein, ΔK58, ΔK50, ΔK49, or ΔK42 means a deletion of Lys at a position corresponding to position 58, 50, 49, or 42, respectively, of the amino acid sequence of SEQ ID NO: 3.

Examples of the means for mutating the parent domain include mutagenesis by which a desired amino acid residue substitution, deletion, or insertion, for example, is created in a polynucleotide encoding the parent domain. Specific examples of the technique for mutagenesis in a polynucleotide include site-specific mutagenesis, homologous recombination, SOE (splicing by overlap extension)-PCR method (Gene, 1989, 77: 61-68), and their detailed procedures are well-known to those skilled in the art.

The produced mutant immunoglobulin-binding domain in the invention has an improved immunoglobulin-binding activity when compared with the parent domain before mutated. Thus, the mutant immunoglobulin-binding domain in the invention can be suitably used as an affinity ligand.

For example, the mutant immunoglobulin-binding domain in the invention as obtained by the above procedure is a polypeptide chain consisting of an amino acid sequence having at least 85% identity with the amino acid sequence of any of SEQ ID NOs: 1 to 12 and having at least one mutation selected from the group consisting of the above (a) to (d).

Preferably, the mutant immunoglobulin-binding domain in the invention is a polypeptide chain consisting of an amino acid sequence having at least 85% identity with the amino acid sequence of any of SEQ ID NO: 1, 2, 3, 7, 8, or 9 and having at least one mutation selected from the group consisting of the above (a) to (d).

More preferably, the mutant immunoglobulin-binding domain in the invention is a polypeptide chain consisting of an amino acid sequence having at least 85% identity with the amino acid sequence of SEQ ID NO: 3 or 9 and having at least one mutation selected from the group consisting of the above (a) to (d).

The at least one mutation selected from the group consisting of (a) to (d) may be any one kind or a combination of two or more kinds of (a) to (d), and is preferably (a) or a combination of (a) and any one or more of (b) to (d), more preferably at least one kind selected from the group consisting of K58R, K50R, K49R, K42R, ΔK58, ΔK50, ΔK49, and ΔK42 or a combination of two or more kinds thereof, and still more preferably K58R, ΔK58, or a combination of K58R and any one or more of K50R, K49R, and K42R.

Alternatively, examples of the mutant immunoglobulin-binding domain in the invention include a polypeptide chain consisting of an amino acid sequence having at least 85% identity with the amino acid sequence of any of SEQ ID NOs: 1 to 12 and having at least one amino acid residue or a deletion thereof selected from the group consisting of the following ($A_1$) to ($D_3$):

($A_1$) Arg at a position corresponding to position 58 of the amino acid sequence of SEQ ID NO: 3;

($A_2$) a deletion of an amino acid residue at a position corresponding to position 58 of the amino acid sequence of SEQ ID NO: 3;

($A_3$) Arg at a position between positions 57 and 58 of the amino acid sequence of SEQ ID NO: 3;

($B_1$) Arg at a position corresponding to position 50 of the amino acid sequence of SEQ ID NO: 3;

($B_2$) a deletion of an amino acid residue at a position corresponding to position 50 of the amino acid sequence of SEQ ID NO: 3;

($B_3$) Arg at a position between positions 49 and 50 of the amino acid sequence of SEQ ID NO: 3;

($C_1$) Arg at a position corresponding to position 49 of the amino acid sequence of SEQ ID NO: 3;

($C_2$) a deletion of an amino acid residue at a position corresponding to position 49 of the amino acid sequence of SEQ ID NO: 3;

($C_3$) Arg at a position between positions 48 and 49 of the amino acid sequence of SEQ ID NO: 3;

($D_1$) Arg at a position corresponding to position 42 of the amino acid sequence of SEQ ID NO: 3;

($D_2$) a deletion of an amino acid residue at a position corresponding to position 42 of the amino acid sequence of SEQ ID NO: 3;

(D₃) Arg at a position between positions 41 and 42 of the amino acid sequence of SEQ ID NO: 3. Preferably, the mutant immunoglobulin-binding domain has any one of (A₁) to (A₃), or has any one of (A₁) to (A₃) in combination with any one or more of (B₁) to (D₃) (i.e., one or two or more selected from the group consisting of any one of (B₁) to (B₃), any one of (C₁) to (C₃), and any one of (D₁) to (D₃)). More preferably, the mutant immunoglobulin-binding domain has at least one or two or more kinds selected from the group consisting of K58R, K50R, K49R, K42R, ΔK58, ΔK50, ΔK49, and ΔK42, and still more preferably has K58R, ΔK58, or a combination of K58R and any one or more of K50R, K49R, or K42R.

Preferred examples of the mutant immunoglobulin-binding domain in the invention include a polypeptide chain consisting of an amino acid sequence having at least 85% identity with the amino acid sequence of any of SEQ ID NO: 1, 2, 3, 7, 8, or 9, and having at least one of an amino acid residue or a deletion thereof selected from the group consisting of the above (A₁) to (D₃). More preferred examples of the mutant immunoglobulin-binding domain in the invention include a polypeptide chain consisting of an amino acid sequence having at least 85% identity with the amino acid sequence of SEQ ID NO: 3 or 9 and having at least one amino acid residue or a deletion thereof selected from the group consisting of the above (A₁) to (D₃). Preferably, the mutant immunoglobulin-binding domain has any one of (A₁) to (A₃), or has any one of (A₁) to (A₃) in combination with any one or more of (B₁) to (D₃) (i.e., one or two or more selected from the group consisting of any one of (B₁) to (B₃), any one of (C₁) to (C₃), and any one of (D₁) to (D₃)). More preferably, the mutant immunoglobulin-binding domain has at least one or two or more kinds selected from the group consisting of K58R, K50R, K49R, K42R, ΔK58, ΔK50, ΔK49, and ΔK42, and still more preferably has K58R, ΔK58, or a combination of K58R and any one or more of K50R, K49R, or K42R.

The mutant immunoglobulin-binding domain in the invention may have a mutation(s) other than the above (a) to (d) as long as the effect of enhancing immunoglobulin-binding activity is not impaired. For example, the mutant immunoglobulin-binding domain in the invention may include, in addition to a mutation(s) other than the above (a) to (d), another mutation(s) for imparting advantageous properties to the domain as an affinity ligand. Preferably, the mutant immunoglobulin-binding domain in the invention has Val at a position corresponding to position 1 of the amino acid sequence of SEQ ID NO: 3, or has Ala at a position corresponding to position 29 of the amino acid sequence of SEQ ID NO: 3. More preferably, the mutant immunoglobulin-binding domain in the invention has Val at a position corresponding to position 1 of the amino acid sequence of SEQ ID NO: 3 and Ala at a position corresponding to position 29 of the amino acid sequence of SEQ ID NO: 3.

Preferably, the mutant immunoglobulin-binding domain in the invention retains at least one of Lys residues present in the first half of the amino acid sequence of the parent domain. More specifically, the mutant immunoglobulin-binding domain in the invention has Lys at at least one of positions corresponding to the positions of Lys residues (e.g., positions 4, 7, and 35 of the amino acid sequence of SEQ ID NO: 3) in the first half of the amino acid sequence of SEQ ID NO: 3. For example, the mutant immunoglobulin-binding domain in the invention has a Lys residue(s) at least at a position corresponding to position 35, preferably at positions corresponding to positions 7 and 35, and more preferably at positions corresponding to positions 4, 7, and 35 in the amino acid sequence of SEQ ID NO: 3. In addition, preferably, the mutant immunoglobulin-binding domain in the invention has Asn at a position corresponding to position 11 of the amino acid sequence of SEQ ID NO: 3.

The immunoglobulin-binding protein of the invention may contain one or more mutant immunoglobulin-binding domain in the invention as described above. Preferably, the immunoglobulin-binding protein of the invention contains two or more, more preferably three or more, and still more preferably four or more mutant immunoglobulin-binding domains described above. Meanwhile, the immunoglobulin-binding protein of the invention contains preferably 12 or less, more preferably 8 or less, and still more preferably 7 or less mutant immunoglobulin-binding domains described above. For example, the immunoglobulin-binding protein of the invention contains preferably 2 to 12, more preferably 3 to 8, and still more preferably 4 to 7 mutant immunoglobulin-binding domains described above. The immunoglobulin-binding protein of the invention may contain two or more mutant immunoglobulin-binding domains. In this case, these mutant immunoglobulin-binding domains may be the same or different, and are preferably the same kinds.

The immunoglobulin-binding protein of the invention may contain another immunoglobulin-binding domain other than the above-described mutant immunoglobulin-binding domain(s). Examples of the other domain(s) include a naturally occurring ProA immunoglobulin-binding domain (e.g., B domain, Z domain, C domain, or D domain of ProA), a naturally occurring ProL immunoglobulin-binding domain (e.g., B1 domain, B2 domain, B3 domain, B4 domain, B5 domain, C1 domain, C2 domain, C3 domain, or C4 domain of ProL), or variants thereof other than the mutant immunoglobulin-binding domains in the invention. The total number of immunoglobulin-binding domains in the immunoglobulin-binding protein comprising the mutant immunoglobulin-binding domain(s) in the invention and other immunoglobulin-binding domains (e.g., naturally occurring ProA immunoglobulin-binding domains) is preferably from 2 to 12, more preferably from 3 to 8, and still more preferably from 4 to 7. Among them, in some cases, the percentage of the number of mutant immunoglobulin-binding domains in the invention with respect to the total number of the immunoglobulin-binding domains is preferably 10% or more and 60% or less and more preferably 20% or more and 50% or less.

Preferred examples of the immunoglobulin-binding protein of the invention include a polypeptide consisting of the amino acid sequence of any of SEQ ID NOs: 14 to 15, 19 to 26, and 28, and more preferred examples include a polypeptide consisting of the amino acid sequence of any of SEQ ID NOs: 14 to 15 and 19 to 26.

From the viewpoints of, for example, increasing the amount of the immunoglobulin-binding protein in the invention immobilized on a support, increasing the number of points bonded to the support, and increasing the antibody binding capacity, any amino acid residue or peptide may be added to or inserted into any one or more of the N-terminus or the C-terminus of the immunoglobulin-binding domain included in the immunoglobulin-binding protein of the invention, or a site between the domains. Preferred examples of the amino acid residue or peptide to be added or inserted include Cys, Lys, Pro, (Pro)p, (Ala-Pro)q, or (Glu-Ala-Ala-Ala-Lys)r (where p is an integer of 2 to 300 and preferably 12 to 24; q is an integer of 4 or more and preferably an integer of 4 to 10; and r is an integer of 2 or more and preferably an integer of 2 to 6).

2. Production of Immunoglobulin-Binding Protein

The immunoglobulin-binding protein of the invention may be produced by a technique known in the art, such as a chemical synthesis process based on an amino acid sequence or a recombinant-producing procedure. For example, the immunoglobulin-binding protein of the invention can be produced using a known genetic recombination technique described in, for example, Current Protocols in Molecular Biology by Frederick M. Ausbel et al., or Molecular Cloning edited by Sambrook et al. (Cold Spring Harbor Laboratory Press, 3rd edition, 2001). Specifically, a protein of interest may be obtained from cultured cells in a large quantity economically by transforming, into a host such as *E. coli*, an expression vector containing a polynucleotide encoding an immunoglobulin-binding protein of the invention and culturing the resulting transformant in an appropriate liquid medium. A preferred expression vector used may be any of known vectors capable of replicating in a host cell. Examples thereof include plasmids described in U.S. Pat. No. 5,151,350 or plasmids described in Molecular Cloning (Cold Spring Harbor Laboratory Press, 3rd edition, 2001) edited by Sambrook et al. In addition, the host for transformation is not particularly limited, and it is possible to use a known host, which is used for expressing a recombinant protein, such as bacteria (e.g., *E. coli*), fungi, insect cells, or mammalian cells. In order to transform a host by introducing a nucleic acid into the host, any method known in the art may be used depending on each host. Examples of the procedure that can be utilized include known procedures described in Molecular Cloning (Cold Spring Harbor Laboratory Press, 3rd edition, 2001) edited by Sambrook et al. A protocol for recovering an expressed protein after the resulting transformant (preferably microbial cells such as bacteria) is cultured is well-known to those skilled in the art. Alternatively, the immunoglobulin-binding protein of the invention may be expressed using a cell-free protein synthesis system.

Thus, the invention also provides a polynucleotide (e.g., DNA) encoding the immunoglobulin-binding protein of the invention, a vector containing the polynucleotide, and a transformant containing them.

3. Affinity Support

The immunoglobulin-binding protein of the invention may be used as an affinity ligand. By immobilizing an immunoglobulin-binding protein of the invention on a solid-phase support, an affinity support having the immunoglobulin-binding protein of the invention as a ligand can be produced. The affinity support is a support using an immunoglobulin-binding protein of the invention as a ligand, and has an improved immunoglobulin-binding capacity when compared with a support using a protein consisting of the above-mentioned parent domain as a ligand.

The shape of a solid-phase support included in the affinity support of the invention may be any form such as a particle, a film, a plate, a tube, a needle, or a fiber. The support may be porous or non-porous. Each support may also be used as a packed bed or in a suspension form. Examples of the suspension form include an expanded bed and those known as a pure suspension, in which particles are free to move. In the case of a monolith, a packed bed, or an expanded bed, the separation procedure generally follows conventional chromatography using a concentration gradient. In the case of a pure suspension, a batch process is used. Preferably, the support is a filler. Alternatively, the support may be in the form of a chip, a capillary, or a filter.

In one embodiment, the solid-phase support preferably has a particle size of 20 μm or larger and 200 μm or less. For example, if the support is made of a synthetic polymer, the particle size is preferably 20 μm or larger, more preferably 30 μm or larger, and preferably 100 μm or less, more preferably 80 μm or less, and for example, preferably from 20 to 100 μm and more preferably from 30 to 80 μm. For example, if the support is made of polysaccharide, the particle size is preferably 50 μm or larger, more preferably 60 μm or larger, and preferably 200 μm or less, more preferably 150 μm or less, and for example, preferably from 50 to 200 μm and more preferably from 60 to 150 μm. If the particle size is 20 μm or larger, the column pressure is less likely to increase even at a high flow rate, and the utility is improved. If the particle size is 200 μm or less, the amount (binding capacity) of immunoglobulins bound to the affinity support is increased. The "particle size" herein means a volume-average particle size measured by laser diffraction according to ISO 13320 and JIS Z 8825-1. Specifically, the average particle size refers to an average particle diameter determined by measuring a particle size distribution with a laser scattering diffraction particle size distribution analyzer (e.g., LS 13 320 (Beckman Coulter, Inc.)), using, for example, Fluid R. I. Real 1.333 and Sample R. I. Real 1.54 Imaginary 0 as an optical model, and measuring a volume-based particle size distribution.

In one embodiment, the solid-phase support is porous and has a specific surface area of preferably 50 $m^2/g$ or larger, more preferably 80 $m^2/g$ or larger, and preferably 150 $m^2/g$ or less, more preferably 130 $m^2/g$ or less, and for example, preferably from 50 to 150 $m^2/g$ and more preferably from 80 to 130 $m^2/g$. Here, if the specific surface area is less than 50 $m^2/g$, the binding capacity may be poor. On the other hand, in the case of more than 150 $m^2/g$, the strength of the support is poor, so that the support is broken at a high flow rate and the column pressure may then increase. The "specific surface area" herein refers to a value obtained by dividing the surface area of pores having a pore diameter of from 10 to 5000 nm as obtained with a mercury porosimeter by the dry weight of the particle.

In one embodiment, the solid-phase support has a volume-average pore size of preferably 100 nm or larger and 1500 nm or less. For example, if the support is made of a synthetic polymer, the volume-average pore size is preferably 100 nm or larger, more preferably 200 nm or larger, and preferably 400 nm or less, more preferably 300 nm or less, and for example, preferably from 100 to 400 nm and more preferably from 200 to 300 nm. For example, if the support is made of polysaccharide, the volume-average pore size is preferably 500 nm or larger, more preferably 800 nm or larger, and preferably 1500 nm or less, more preferably 1400 nm or less, and for example, preferably from 500 to 1500 nm and more preferably from 800 to 1400 nm. Here, if the volume-average pore size is less than 100 nm, the binding capacity may be markedly reduced at a high flow rate. On the other hand, in the case of more than 1500 nm, the binding capacity may decrease regardless of the flow rate. The "volume-average pore size" herein refers to a volume-average pore diameter of pores having a pore diameter of from 10 to 5000 nm as obtained using a mercury porosimeter.

The solid-phase support may satisfy the particle size and the specific surface area in the above ranges. In this case, it is possible to optimize an inter-particle gap serving as a flow path of a solution to be purified and a balance between the diameter of relatively large pores in the particle and the binding surface area of a molecule to be purified. This enables the binding capacity at a high flow rate to be maintained at a high level.

The material for the solid-phase support is, for example, a polymer having a hydrophilic surface. For example, the material is a polymer having a hydroxy group (—OH), a carboxy group (—COOH), an aminocarbonyl group (—CONH$_2$ or N-substituted one), an amino group (—NH$_2$ or substituted one), or an oligo or polyethyleneoxy group on the outer surface (and also on the inner surface, if any) by hydrophilization treatment. In one embodiment, the polymer may be a synthetic polymer such as a polymethacrylate-based, polyacrylamide-based, polystyrene-based, or polyvinyl alcohol-based polymer. Preferably, these synthetic polymers may be obtained by crosslinking a multifunctional monomer such as multifunctional (meth)acrylate or divinylbenzene. Such a synthetic polymer is easily produced by a known process (see, for example, the process described in J. MATER. CHEM 1991, 1 (3): 371-374). Examples of a polymer in other embodiments include a polysaccharide compound such as dextran, cellulose, pullulan, or agarose. Such a polysaccharide compound may be easily produced by a known process (see, for example, the process described in Japanese Patent No. 4081143). In other embodiments, an inorganic support such as silica or zirconium oxide may be used.

In one embodiment, specific examples of a porous particle used as the solid-phase support include a porous organic polymer particle containing, for example, a copolymer of 20 to 50 mass % crosslinkable vinyl monomer, 3 to 80 mass % epoxy-containing vinyl monomer, and 20 to 80 mass % diol structure-containing vinyl monomer, and having a particle size of from 20 to 80 μm, a specific surface area of from 50 to 150 m$^2$/g, and a volume-average pore size of from 100 to 400 nm.

Note that the solid-phase support may be measured with a mercury porosimeter; and in this case, the infiltration volume (pore volume) of pore having a pore diameter of from 10 to 5000 nm is preferably from 1.3 mL/g to 7.0 mL/g. For example, if the support is made of a synthetic polymer, the pore volume is preferably 1.3 mL/g or larger and preferably 7.0 mL/g or less, more preferably 5.0 mL/g or less, and still more preferably 2.5 mL/g or less, and for example, preferably from 1.3 to 7.0 mL/g, more preferably from 1.3 to 5.0 mL/g, and still more preferably from 1.3 to 2.5 mL/g. In addition, for example, if the support is made of polysaccharide, the pore volume is preferably from 3.0 to 6.0 mL/g.

As a procedure for causing a ligand (i.e., an immunoglobulin-binding protein of the invention) to be immobilized on the solid-phase support, a routine protocol for immobilizing a protein onto a support may be used. Examples include: a procedure in which a support having a carboxy group is used, the carboxy group is activated by N-hydroxysuccinimide to make a reaction with an amino group of a ligand; a procedure in which a support having an amino group or a carboxy group is used and the amino group or the carboxy group is reacted with a carboxy group or an amino group, respectively, of a ligand in the presence of a dehydration-condensation agent such as water-soluble carbodiimide to form an amide bond; a procedure in which a support having a hydroxyl group is used and the hydroxyl group is activated by cyan halide such as cyan bromide to react with an amino group of a ligand; a procedure in which a hydroxyl group of a support is tosylated or tresylated to react with an amino group of ligand; a procedure in which an epoxy group is introduced into a support by using, for example, bisepoxide or epichlorohydrin, and reacted with an amino group, a hydroxyl group, or a thiol group of a ligand; or a procedure in which a support having an epoxy group is used and the epoxy group is reacted with an amino group, a hydroxyl group, or a thiol group of a ligand. Among them, from the viewpoint of stability in an aqueous reaction solution, it is desirable to use a procedure in which an epoxy group is used to immobilize a ligand.

The hydroxyl group generated by ring-opening of the epoxy group serves to make hydrophilic the surface of the support to prevent non-specific adsorption of proteins and others, improve toughness of the support in water, and prevent destruction of the support at a high flow rate. Thus, if any ligand-unbound epoxy group remains in the support after ligand immobilization, it is preferable to open the ring of the remaining epoxy group. Examples of a procedure for ring-opening the epoxy group on the support include a procedure in which the support is stirred in an aqueous solvent in the presence of an acid or an alkali while heating or at room temperature. The epoxy group may be ring-opened with a blocking agent having a mercapto group such as mercaptoethanol or thioglycerol or a blocking agent having an amino group such as monoethanolamine. A more preferred procedure for ring-opening an epoxy group is a procedure for ring-opening an epoxy group included in a support by using thioglycerol. Thioglycerol has lower toxicity than, for example, mercaptoethanol as a raw material. Meanwhile, the ring-opening of the epoxy group by using thioglycerol is more advantageous than the ring-opening by using a blocking agent having an amino group because non-specific adsorption on the support is reduced and the dynamic binding capacity is increased.

In order to prevent adhesion of a ligand to a solid-phase support, the ligand and the solid-phase support may be bonded via a linker. The linker may be constructed by linking a compound having a linker moiety (linker compound) to the ligand and the solid-phase support. Examples of the linker include a linker having a chain structure such as a polymethylene chain, a polyethylene glycol chain, a polypeptide chain, a polyvinyl alcohol chain, or a sugar chain. Preferably, the linker includes a repeating unit. Preferably, the linker contains a polyethylene glycol chain having a structural unit represented by the following formula (1), wherein n is an integer of preferably 4 or more and 100 or less, more preferably 7 or more and 30 or less, and still more preferably 10 or more and 28 or less.

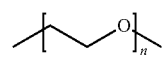

(1)

The linker compound further includes, in addition to the above chain structure (e.g., a polyethylene glycol chain), preferably at least one selected from the group consisting of an epoxy group, a carboxy group, a (meth)acrylic group, an aldehyde group, and a succinimidyl group, more preferably at least one selected from the group consisting of an epoxy group and a carboxy group, and still more preferably an epoxy group. More preferably, the linker compound is a bifunctional epoxy compound.

Examples of the bifunctional epoxy compound include ethylene glycol diglycidyl ether or polyethylene glycol diglycidyl ether. The bifunctional epoxy compound may be used to construct a linker by linking an epoxy moiety of the compound to each of a ligand or a solid-phase support. For example, the linker may be constructed by linking a linker compound to a support and a ligand using the procedure described in JP 2017 083363A. More specifically, examples of the procedure for introducing a linker into a support include a procedure in which a linker compound and a support are stirred in an aqueous solvent under basic conditions while heating or at room temperature.

The linker has a linker length of preferably 20 or more and 1000 or less, more preferably 30 or more and 500 or less, and still more preferably 40 or more and 300 or less. The term "linker length" means the number of atoms in the main chain of the linker moiety between the ligand and the solid-phase support. For example, if the linker compound is a bifunctional epoxy compound containing a polyethylene glycol chain and an epoxy group, the linker length is the total of the chain length of the polyethylene glycol chain and the number of carbon atoms derived from the epoxy group.

4. Method of Isolating Antibody or Fragment Thereof

A method of isolating an antibody or a fragment thereof (hereinafter, simply referred to as an antibody) according to an embodiment of the invention will be described. The method of isolating an antibody according to this embodiment includes: a step (first step) of bringing an antibody-containing sample into contact with an affinity support on which an immunoglobulin-binding protein of the invention is immobilized so as to adsorb the antibody on the support; and a step (second step) of eluting the antibody from the support, the method further preferably comprising a step (third step) of, after the second step, washing the support with an alkaline solution.

In the first step, the antibody-containing sample is made to flow through, for example, a column packed with an affinity support of the invention under conditions in which the antibody is adsorbed onto a ligand (immunoglobulin-binding protein of the invention). In this first step, most of substances other than the antibody in the sample pass through the column without being adsorbed onto the ligand. Thereafter, if necessary, the support may be washed with a neutral buffer containing a salt such as NaCl in order to remove some substances weakly retained by the ligand.

In the second step, an appropriate buffer at pH 2 to 5 is made to flow so as to elute the antibody adsorbed on the ligand. By collecting this eluate, the antibody can be isolated from the sample.

In order to increase the purity of the antibody, the antibody contained in the eluate obtained in the second step may be further purified. The antibody may be purified by, for example, cation exchange chromatography, anion exchange chromatography, mixed mode chromatography, hydrophilic interaction chromatography, hydrophobic interaction chromatography, or size exclusion chromatography used singly or in combination, if appropriate. For example, the eluate obtained in the second step may be subjected to cation exchange chromatography followed by anion exchange chromatography to purify the antibody. The cation exchange chromatography may be performed using, for example, SP-Sepharose FF (manufactured by GE Healthcare Biosciences), BioPro IEX S (manufactured by YMC, Inc.), or BioPro IEX SmartSep S (manufactured by YMC, Inc.). The anion exchange chromatography may be performed using, for example, Q-Sepharose FF (manufactured by GE Healthcare Biosciences), BioPro IEX Q (manufactured by YMC, Inc.), or BioPro IEX SmartSep Q (manufactured by YMC, Inc.).

In the method of isolating an antibody according to this embodiment, the second step may be followed by the third step. In the third step, the affinity support is washed with an alkaline solution (CIP washing). Examples of the alkaline solution used in the third step include aqueous sodium hydroxide, aqueous potassium hydroxide, aqueous triethylamine, or aqueous tetrabutylammonium hydroxide. The washed affinity support may be recycled for antibody isolation.

In the method of isolating an antibody according to an embodiment of the invention, the isolated antibody is used as an antibody drug. Thus, in one embodiment, the invention provides a process for producing an antibody drug by using an affinity support of the invention. The procedure of this process is basically the same as the procedure of the above method of isolating an antibody except that a sample containing an antibody drug of interest is used.

EXAMPLES

Hereinafter, the present invention will be described in more detail with reference to examples. However, the following description only generally shows aspects of the present invention, and the present invention shall not be limited by such description without any particular reason.

Preparation Example 1: Preparation of Immunoglobulin Binding Proteins (PrA-1 to 16)

Immunoglobulin binding proteins PrA-1 to 16 were obtained. PrA-1, 4 and 15 are immunoglobulin binding proteins comprising linear homopentamer and homotetramer of A1V/G29A mutant of C-domain of protein A (SEQ ID NO:3) (alkaline resistance enhanced variants; Journal of Chromatography B, 2007, 848 (1):40-47) and monomer of said A1V/G29A variant, respectively. PrA-2, 3, 5-14, and 16 are immunoglobulin binding proteins into which the mutations listed in Tables 1 were introduced for the respective domains of PrA-1, 4, and 15, respectively. Among these, PrA-5 and 6 are comparative immunoglobulin binding proteins. PrA-5 consists of a known mutant domains disclosed in Patent Document 1 etc. PrA-6 consists of a mutant domain in which all Lys (K4, K7, K35, K42, K49, K50, and K58) in the C domain are substituted with Arg.

TABLE 1

| Immunoglobulin binding proteins | Patent domain | Mutation in domains (from N term -> C term) | | | | | Number of domain | Seq. No. |
|---|---|---|---|---|---|---|---|---|
| | | 1 | 2 | 3 | 4 | 5 | | |
| PrA-1 | Seq. No. 3 | — | — | — | — | — | 5 | 13 |
| PrA-2 | (A1V/G29A) | K58R | K58R | K58R | K58R | K58R | | 14 |
| PrA-3 | | — | — | — | K58R | K58R | | 15 |
| PrA-4 | | — | — | — | — | | 4 | 16 |
| PrA-5 | | K35R | K35R | K35R | K35R | | | 17 |
| PrA-6 | | K all R | K all R | K all R | K all R | | | 18 |

TABLE 1-continued

| Immunoglobulin binding proteins | Patent domain | Mutation in domains (from N term -> C term) 1 | 2 | 3 | 4 | 5 | Number of domain | Seq. No. |
|---|---|---|---|---|---|---|---|---|
| PrA-7  | | ΔK58 | ΔK58 | ΔK58 | ΔK58 | | | 19 |
| PrA-8  | | K42R | K42R | K42R | K42R | | | 20 |
| PrA-9  | | K49R | K49R | K49R | K49R | | | 21 |
| PrA-10 | | K50R | K50R | K50R | K50R | | | 22 |
| PrA-11 | | K58R | K58R | K58R | K58R | | | 23 |
| PrA-12 | | K58R | — | — | — | | | 24 |
| PrA-13 | | — | — | — | K58R | | | 25 |
| PrA-14 | | — | — | K58R | K58R | | | 26 |
| PrA-15 | | — | | | | | 1 | 27 |
| PrA-16 | | K58R | | | | | | 28 |

—: No mutation;
K all R: K4R, K7R, K35R, K42R, K49R, K50R, K58R

Expression and purification of PrA-1 to 16 were performed as follows, respectively:

Plasmids encoding PrA-1 to 16 were used to transform *E. coli* BL21(DE3) (from NEW ENGLAND BIOLABS) and the obtained transformants were cultured in enriched culture medium at 37° C. until reaching log phase of growth. Thereafter, added final concentration of 1 mM isopropyl-β-thiogalactopyranoside (from Wako Pure Chemical Industries, Ltd.) to the medium, and further cultured at 37° C. for 4 hours, to express target proteins. Subsequently, the culture liquid was centrifuged to remove the supernatant, and 30 mM Tris buffer (pH9.5) containing eggwhite-derived lysozyme (from Wako Pure Chemical Industries, Ltd.) and polyoxyethylene (10) octylphenyl ether (from Wako Pure Chemical Industries, Ltd.) was added to the obtained bacterial cells, and crushed the bacterial cells. Recombinant immunoglobulin binding proteins were purified from the obtained cell lysate via cation exchange chromatography (SP-Sepharose FF, from GE Healthcare Biosciences) and anion exchange chromatography (Q-Sepharose FF, from GE Healthcare Biosciences). Purified immunoglobulin junction proteins were dialyzed against 10 mM citrate buffer (pH6.0). The purity of recombinant immunoglobulin binding proteins confirmed by SDS-PAGE was 95% or greater.

Preparation 2: Synthesis of Porous Activated Wet Particles (PB1 to 7)

(1) 3.58 g of polyvinyl alcohol (PVA-217, from Kuraray Co., Ltd.) was added to 360 g of pure water, heated while stirring to dissolve polyvinyl alcohol, cooled, and then 0.36 g of sodium dodecyl sulfate (from Wako Pure Chemical Industries, Ltd.), 0.36 g of sodium sulfate (from Wako Pure Chemical Industries, Ltd.), and 0.18 g of sodium nitrite (from Wako Pure Chemical Industries, Ltd.) were added and stirred, to prepare Aqueous Solution S.

(2) A monomer composition consisting of 12.00 g of glycidyl methacrylate (from Mitsubishi Rayon Co., Ltd.) and 1.33 g of divinylbenzene (from Nippon Steel Chemical Co., Ltd.) was dissolved in 24.43 g of diisobutyl ketone (from Mitsui Chemical Co., Ltd.), to prepare a monomer solution.

(3) A total amount of Aqueous Solution S obtained in (1) was charged into a separable flask, and a thermometer, a stirring blade and a cooling tube were mounted, and the flask was set in a hot water bath, and started stirring under nitrogen atmosphere. A total amount of the monomer solution obtained in (2) was charged into a separable flask and warmed by a hot water bath. After internal temperature was reached to 85° C., 0.53 g of 2,2'-azobisisobutyronitrile (from Wako Pure Chemical Industries, Ltd.) was added.

(4) The reaction solution obtained in (3) was stirred for 3 hours while maintaining the temperature at 86° C. Then, after cooling the reaction solution, the particles obtained by filtration were washed with pure water and ethanol. The washed particles were dispersed in pure water and decantation was performed 3 times, to remove small particles. Then, the particles were dispersed in pure water such that the concentration of the particles was 10% by mass, to obtain a porous wet particle dispersion.

(5) 10 g of ethylene glycol diglycidyl ether (product name EX-810: from Nagase Chemtex Co., Ltd.), 40 g of 1,4-dioxane, and 15 g of 50% by mass aqueous sodium hydroxide were added to 10 g of the porous wet particle dispersion obtained in (4), and the mixture was stirred at 60° C. for 8 hours. The particle slurry liquid after the reaction was cooled and then filtered, and washed with pure water and ethanol. Such particle slurry liquid was filtered again, to obtain porous activated wet particles: PB1.

(6) Similarly to the procedure in (5), except that ethylene glycol diglycidyl ether was replaced with polyethylene glycol diglycidyl ether (degree of polymerization 4: EX-830: from Nagase Chemtex Co., Ltd.), porous activated wet particle: PB2 was obtained.

(7) Similarly to the procedure in (5), except that ethylene glycol diglycidyl ether was replaced with polyethylene glycol diglycidyl ether (degree of polymerization 22: EX-861: from Nagase Chemtex Co., Ltd.), porous activated wet particle: PB3 was obtained.

(8) Similarly to the procedure in (5), except that ethylene glycol diglycidyl ether was replaced with glycidyl acrylate, porous activated wet particle: PB4 was obtained.

(9) Similarly to the procedure in (5), except that ethylene glycol diglycidyl ether was replaced with neopentyl glycol diglycidyl ether (EX-211: from Nagase Chemtex Co., Ltd.), porous activated wet particle: PB5 was obtained.

(10) Similarly to the procedure in (5), except that ethylene glycol diglycidyl ether was replaced with 1,6-hexanediol diglycidyl ether (EX-212: from Nagase Chemtex Co., Ltd.), porous activated wet particle: PB6 was obtained.

(11) Similarly to the procedure in (5), except that ethylene glycol diglycidyl ether was replaced with hydrogenated bisphenol A diglycidyl ether (EX-252: from Nagase Chemtex Co., Ltd.), porous activated wet particle: PB7 was obtained.

Preparation Example 3: Preparation of Ligand Immobilized Particles

To 5 mL of the dispersion containing the porous activated wet particles (PB1) obtained in Production Example 2, 24.1 mL of 0.1M carbonate buffer (1.1M sulfate containing 129 mg of PrA-1, pH8.8) containing PrA-1 prepared in Production Example 1 was added, and the solution was mixed by shaking at 25° C. for 5 hours, to bind PrA-1 to PB1. After blocking epoxy groups remaining on the particles using thioglycerol, the particles were washed using 0.5M NaOH and 0.1M citrate buffer (pH3 2), to obtain ligand-immobilized particles (PrA-1/PB1). In a similar procedure, any one of PrA-2 to 16 and any one of porous activated wet particles (PB1 to 7) were bound, to obtain ligand-immobilized particles (PrA-1 to 16/PB1 to 7).

Test Example 1: Measurement of Dynamic Binding Capacitance (DBC)

DBC of PrA-1 to 16/PB1 to 7 against target proteins (human IgG antibody, HGG-1000 from Equitech-Bio) at a linear flow rate of 60 cm/hr were measured using AKTAprime plus from GE Healthcare. A 4 mL container (5 mmφ×200 m long) filled with 4 mL of filler was used as a column. The target protein was diluted to 25 mg/mL using aqueous solution containing 20 mM sodium phosphate/150 mM sodium chloride (pH7.5), and flowed through the column. DBC was measured from the amount of protein captured at the time of elution tip 10% breakthrough at a linear flow rate of 60 cm/hr and column packing volume. The results were shown in Table 2 to 4.

TABLE 2

| Ligand Immobilized Particles | Domains (from N term -> C term) | | | | | Number of domain | Linker | DBC (mg/mL-particle) |
|---|---|---|---|---|---|---|---|---|
| | 1 | 2 | 3 | 4 | 5 | | | |
| PrA-1/PB1 (control) | — | — | — | — | — | 5 | EX-810 | 55.2 |
| PrA-2/PB1 | K58R | K58R | K58R | K58R | K58R | | EX-810 | 62.7 |
| PrA-2/PB2 | K58R | K58R | K58R | K58R | K58R | | EX-830 | 64.5 |
| PrA-3/PB1 | — | — | — | K58R | K58R | | EX-810 | 64.1 |

—: No mutation

TABLE 3

| Ligand Immobilized Particles | Domains (from N term -> C term) | | | | | Number of domain | Linker | DBC (mg/mL-particle) |
|---|---|---|---|---|---|---|---|---|
| | 1 | 2 | 3 | 4 | 5 | | | |
| PrA-4/PB1 (control) | — | — | — | — | | 4 | EX-810 | 50.2 |
| PrA-5/PB1 (comp. Ex.) | K35R | K35R | K35R | K35R | | | EX-810 | 50.1 |
| PrA-6/PB1 (comp. Ex.) | K all R | K all R | K all R | K all R | | | EX-810 | 49.5 |
| PrA-7/PB1 | ΔK58 | ΔK58 | ΔK58 | ΔK58 | | | EX-810 | 58.7 |
| PrA-8/PB1 | K42R | K42R | K42R | K42R | | | EX-810 | 56.8 |
| PrA-9/PB1 | K49R | K49R | K49R | K49R | | | EX-810 | 56.1 |
| PrA-10/PB1 | K50R | K50R | K50R | K50R | | | EX-810 | 57.6 |
| PrA-11/PB1 | K58R | K58R | K58R | K58R | | | EX-810 | 58.5 |
| PrA-11/PB2 | K58R | K58R | K58R | K58R | | | EX-830 | 63.1 |
| PrA-11/PB3 | K58R | K58R | K58R | K58R | | | EX-861 | 65.5 |
| PrA-11/PB4 | K58R | K58R | K58R | K58R | | | Glycidyl acrylate | 57.5 |
| PrA-11/PB5 | K58R | K58R | K58R | K58R | | | EX-211 | 58.0 |
| PrA-11/PB6 | K58R | K58R | K58R | K58R | | | EX-212 | 58.2 |
| PrA-11/PB7 | K58R | K58R | K58R | K58R | | | EX-252 | 57.8 |
| PrA-12/PB1 | K58R | — | — | — | | | EX-810 | 59.1 |
| PrA-13/PB1 | — | — | — | K58R | | | EX-810 | 61.7 |
| PrA-14/PB1 | — | — | K58R | K58R | | | EX-810 | 60.0 |

—: No mutation;
K all R: K4R, K7R, K35R, K42R, K49R, K50R, K58R

TABLE 4

| Ligand Immobilized Particles | Domains (from N term -> C term) | | | | | Number of domain | Linker | DBC (mg/mL-particle) |
|---|---|---|---|---|---|---|---|---|
| | 1 | 2 | 3 | 4 | 5 | | | |
| PrA-15/PB1 (control) | — | | | | | 1 | EX-810 | 33.2 |
| PrA-16/PB1 | K58R | | | | | | EX-810 | 38.2 |

—: No mutation

---

The invention claimed is:

1. An affinity support, comprising:
a solid-phase support, and
an immunoglobulin-binding protein immobilized onto the solid-phase support,
the immunoglobulin-binding protein comprising a mutant immunoglobulin-binding domain, and
the mutant immunoglobulin-binding domain consisting of an amino acid sequence having at least 85% identity with an amino acid sequence of any of SEQ ID NOs: 1 to 12,
wherein the amino acid sequence of the mutant immunoglobulin-binding domain has at least one mutation selected from the group consisting of the following mutations (a) to (d):
(a) a substitution of Lys with another amino acid residue, a deletion of Lys, or an insertion of another amino acid residue at a position before or after Lys at a position corresponding to position 58 of the amino acid sequence of SEQ ID NO: 3;
(b) a substitution of Lys with another amino acid residue, a deletion of Lys, or an insertion of another amino acid residue at a position before or after Lys at a position corresponding to position 50 of the amino acid sequence of SEQ ID NO: 3;
(c) a substitution of Lys with another amino acid residue, a deletion of Lys, or an insertion of another amino acid residue at a position before or after Lys at a position corresponding to position 49 of the amino acid sequence of SEQ ID NO: 3; and
(d) a substitution of Lys with another amino acid residue, a deletion of Lys, or an insertion of another amino acid residue at a position before or after Lys at a position corresponding to position 42 of the amino acid sequence of SEQ ID NO: 3, and
the amino acid sequence of the mutant immunoglobulin-binding domain has Lys at at least one position selected from the group consisting of positions corresponding to positions 4, 7, and 35 in the amino acid sequence of SEQ ID NO: 3,
wherein the solid-phase support and the immunoglobulin-binding protein are immobilized via a linker,
the linker comprises a polyethylene glycol chain and an epoxy group, a carboxy group, a (meth)acrylic group, an aldehyde group, or a succinimidyl group,
the linker has a length is from 40 to 300, wherein the linker length is the total of a chain length of the polyethylene glycol chain and the number of carbon atoms derived from the epoxy group, carboxy group, a (meth)acrylic group, an aldehyde group, or a succinimidyl group.

2. The affinity support of claim 1, wherein the mutant immunoglobulin-binding domain consists of an amino acid sequence having at least 85% identity with the amino acid sequence of SEQ ID NO: 3 or 9.

3. The affinity support of claim 1, wherein:
the mutation (a) is a substitution of Lys by Arg, a deletion of Lys, or an insertion of Arg at a position before Lys at a position corresponding to position 58 of the amino acid sequence of SEQ ID NO: 3;
the mutation (b) is a substitution of Lys by Arg, a deletion of Lys, or an insertion of Arg at a position before Lys at a position corresponding to position 50 of the amino acid sequence of SEQ ID NO: 3;
the mutation (c) is a substitution of Lys by Arg, a deletion of Lys, or an insertion of Arg at a position before Lys at a position corresponding to position 49 of the amino acid sequence of SEQ ID NO: 3; and
the mutation (d) is a substitution of Lys by Arg, a deletion of Lys, or an insertion of Arg at a position before Lys at a position corresponding to position 42 in the amino acid sequence of SEQ ID NO: 3.

4. The affinity support of claim 1, wherein the amino acid sequence of the mutant immunoglobulin-binding domain has the mutation (a).

5. The affinity support of claim 4, wherein the mutant immunoglobulin-binding domain has Arg at a position corresponding to position 58 of the amino acid sequence of SEQ ID NO: 3.

6. The affinity support of claim 1, wherein the amino acid sequence of the mutant immunoglobulin-binding domain has at least 90% identity with the amino acid sequence of any of SEQ ID NOs: 1 to 12.

7. The affinity support of claim 1, wherein the amino acid sequence of the mutant immunoglobulin-binding domain further has at least one amino acid residue selected from the group consisting of Val at a position corresponding to position 1 of the amino acid sequence of SEQ ID NO: 3 and Ala at a position corresponding to position 29 of the amino acid sequence of SEQ ID NO: 3.

8. The affinity support of claim 1, wherein the immunoglobulin-binding protein comprises two or more immunoglobulin-binding domains.

9. A chromatography column, comprising the affinity support of claim 1.

10. A method of isolating an antibody or a fragment thereof, comprising using the affinity support of claim 1 or a chromatography column comprising the affinity support.

11. The affinity support of claim 1, wherein the linker comprises the epoxy group.

12. The affinity support of claim 1, wherein the linker is a bifunctional epoxy compound comprising the polyethylene glycol chain and the epoxy group,
   wherein the linker length is the total of the chain length of the polyethylene glycol chain and the number of carbon atoms derived from the epoxy group.

* * * * *